(12) United States Patent
Johnson et al.

(10) Patent No.: US 12,337,744 B1
(45) Date of Patent: Jun. 24, 2025

(54) BED LIFTS AND RELATED STRUCTURES

(71) Applicant: Lippert Components, Inc., Elkhart, IN (US)

(72) Inventors: Chad Johnson, Fielding, UT (US); Richard Briggs, Roy, UT (US); Aaron Rasmussen, Fruit Heights, UT (US); Ryan Smith, Goshen, IN (US)

( * ) Notice: Subject to any disclaimer, the term of this patent is extended or adjusted under 35 U.S.C. 154(b) by 760 days.

(21) Appl. No.: 17/451,640

(22) Filed: Oct. 20, 2021

Related U.S. Application Data

(60) Provisional application No. 63/094,341, filed on Oct. 20, 2020.

(51) Int. Cl.
 *B60N 3/00* (2006.01)
 *B60N 2/34* (2006.01)

(52) U.S. Cl.
 CPC .............. *B60N 3/008* (2013.01); *B60N 2/34* (2013.01)

(58) Field of Classification Search
 CPC ..................................... B60N 2/34; B60P 3/39
 USPC ................... 296/174, 24.33; 5/118
 See application file for complete search history.

(56) References Cited

U.S. PATENT DOCUMENTS

| | | | | |
|---|---|---|---|---|
| 2,730,213 | A * | 1/1956 | Mason | A47C 17/84 5/10.1 |
| 4,837,877 | A * | 6/1989 | Hamada | A47C 17/84 5/10.2 |
| 5,020,169 | A * | 6/1991 | Hamada | A47C 17/84 5/10.2 |
| 6,604,471 | B1 * | 8/2003 | Tarver, Jr. | B61D 33/00 108/35 |
| 6,629,322 | B1 * | 10/2003 | Monroe | A47C 17/84 5/118 |
| 7,073,217 | B2 * | 7/2006 | Stevenson | A47C 17/1655 5/118 |
| 2003/0110559 | A1 * | 6/2003 | Weigand | A61G 7/1044 5/81.1 R |
| 2004/0143901 | A1 * | 7/2004 | Roepke | A47C 17/84 5/10.2 |
| 2005/0239586 | A1 * | 10/2005 | Nebel | A63H 17/05 474/58 |
| 2006/0220417 | A1 * | 10/2006 | Rasmussen | A47C 19/20 296/156 |
| 2006/0260044 | A1 * | 11/2006 | Nebel | A47C 19/20 5/118 |

(Continued)

*Primary Examiner* — Jason S Morrow
(74) *Attorney, Agent, or Firm* — FisherBroyles, LLP

(57) ABSTRACT

Various embodiments of structures with one or more movable beds and bed lifts capable of moving one or more beds are described. In one embodiment, a structure includes a bed movable between a sleeping configuration, a stowed configuration, and a split configuration where one portion of the bed is lowered and another portion of the bed is raised. In another embodiment, a structure includes a bed movable between a sleeping configuration, a stowed configuration, a first seating configuration where the bed forms a seating unit facing one direction, and a second seating configuration where the seating unit faces another direction. In another embodiment, a structure includes a slide-out room movable between a retracted position and an extended position and a bed movable between a sleeping configuration and a stowed configuration. The bed is positioned in the area in the structure into which the slide-out room retracts.

20 Claims, 24 Drawing Sheets

(56) References Cited

U.S. PATENT DOCUMENTS

| | | | | |
|---|---|---|---|---|
| 2007/0226901 | A1* | 10/2007 | Pervorse | B60P 1/02 5/118 |
| 2010/0132113 | A1* | 6/2010 | Roepke | A47C 17/84 5/10.1 |
| 2013/0081336 | A1 | 4/2013 | Rasmussen | |
| 2014/0159410 | A1* | 6/2014 | Rasmussen | B60P 3/39 296/24.33 |
| 2015/0041601 | A1* | 2/2015 | Quigley | F16M 11/24 318/446 |
| 2015/0239387 | A1* | 8/2015 | Marasco | B60P 3/39 296/156 |
| 2015/0323122 | A1* | 11/2015 | Gardner | B66F 7/02 254/385 |
| 2015/0329035 | A1 | 11/2015 | Johnson et al. | |
| 2016/0325838 | A1* | 11/2016 | Erhel | B60N 2/34 |
| 2017/0259725 | A1 | 9/2017 | Johnson et al. | |
| 2018/0027978 | A1 | 2/2018 | Johnson et al. | |
| 2019/0217752 | A1 | 7/2019 | Johnson | |
| 2020/0331382 | A1 | 10/2020 | Johnson et al. | |

\* cited by examiner

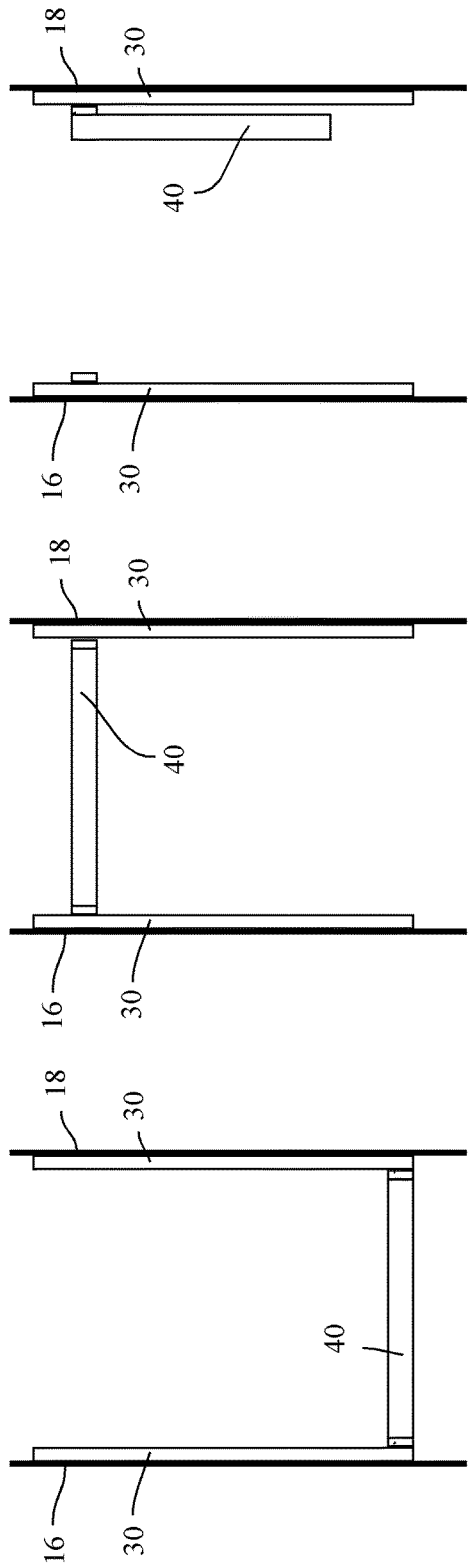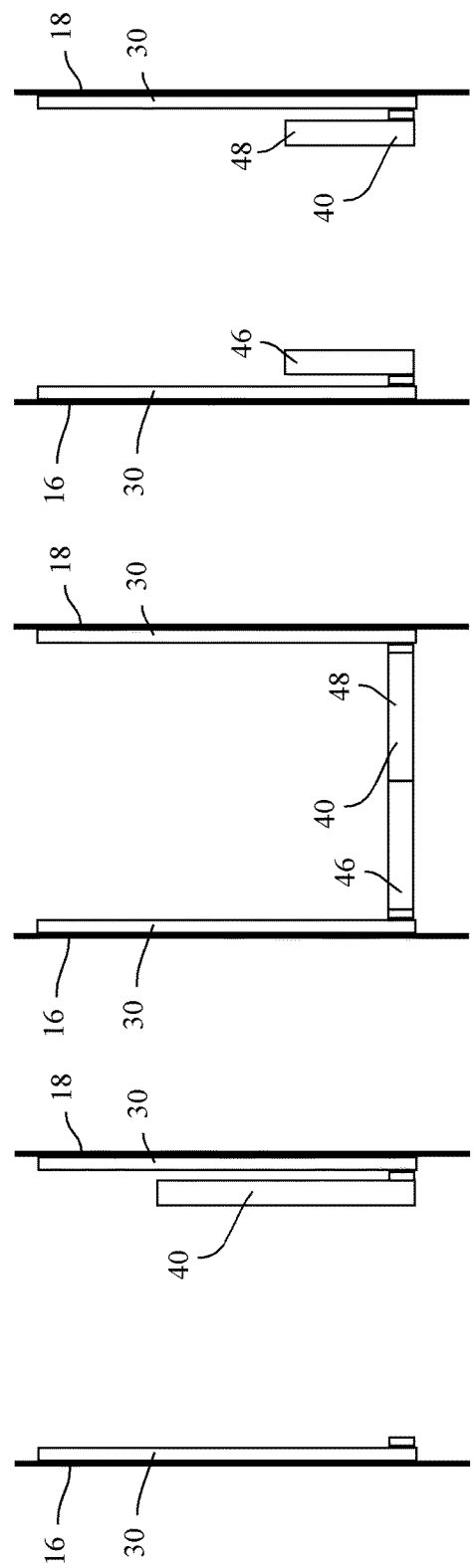

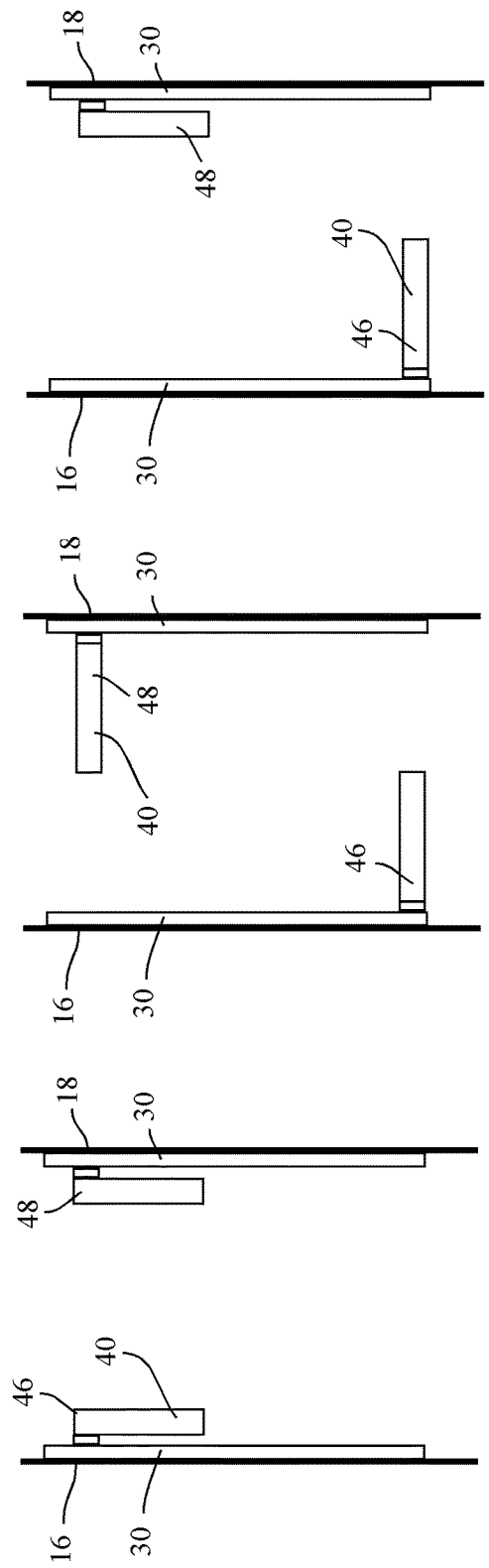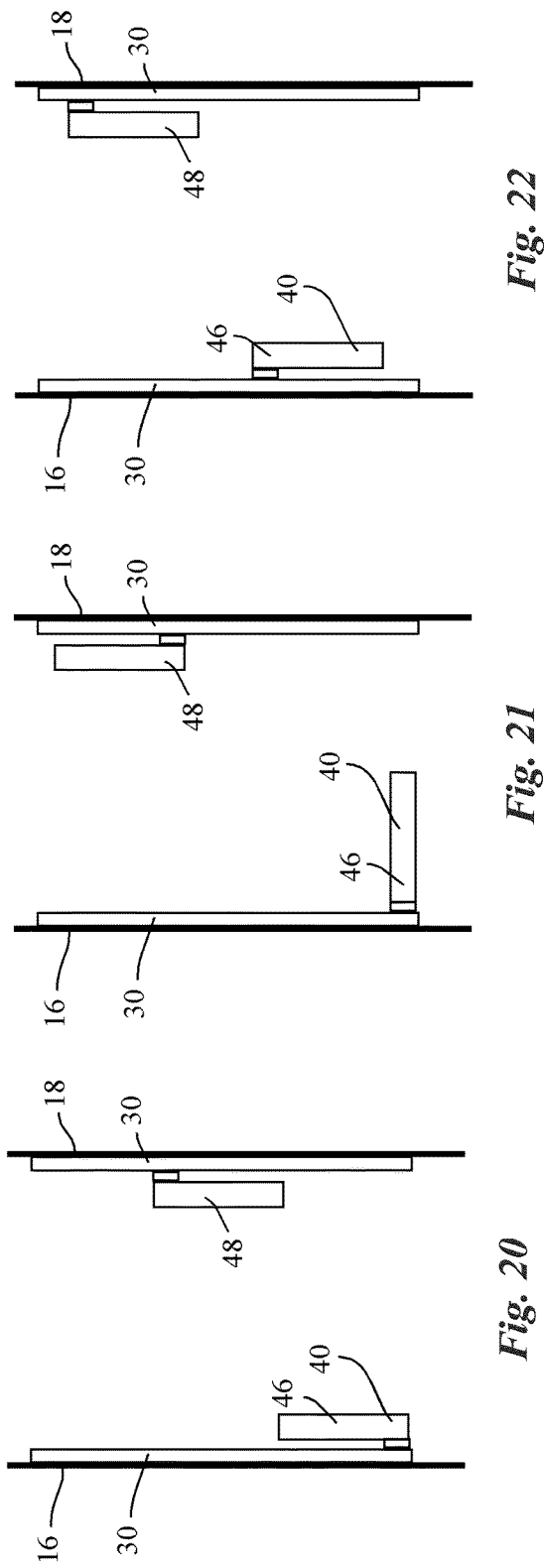

BED LIFTS AND RELATED STRUCTURES

TECHNICAL FIELD

This relates to bed lifts, bed lift components, and structures that include bed lifts.

BACKGROUND

Shelter from the elements is a basic human need. Over the years, a number of structures have been developed to satisfy this need. For example, structures such as homes, apartments, condominiums, and the like have been used to effectively provide shelter from the elements. In addition to these immobile structures, mobile structures such as land vehicles, aircraft, watercraft, and the like have also been used to effectively shelter and/or transport people. Many of these structures are used not just to provide shelter but also to provide living quarters.

Ever since people began to use structures as living quarters, there has been an almost universal desire to increase the size and comfort provided by these structures. This is true regardless of whether the structure is mobile or immobile. For immobile structures, this desire is manifest by the continually increasing size of homes, apartments, condominiums, hotels, and the like. In the context of mobile structures, the desire for more space and comfort is manifest by the increased size of land vehicles, aircraft, watercraft, and the like.

The size of immobile structures is often limited by factors such as cost, available real estate in the area, government regulations, and the like. The size of mobile structures is often limited by transportation regulations set by the government (e.g., width of a road vehicle, length of a road vehicle, etc.) and by the physical dimensions of the roads (e.g., width of a travel lane, distance between railroad tracks, height of bridges, etc.) or other medium of transportation (e.g., waterways, etc.). Moreover, building larger structures unnecessarily increases the consumption of valuable resources (e.g., land, steel, wood, etc.). Accordingly, it would be desirable to utilize the space more effectively in structures without increasing the "footprint" of the structures.

One type of vehicle where it is especially desirable to maximize the utility of the interior space is a "toy hauler" type recreational vehicle. A toy hauler is a recreational vehicle having a cargo area used to receive and transport off-road vehicles. Bed lifts have been developed for the cargo area of toy haulers as described in the incorporated documents listed at the end of the description.

One problem associated with conventional bed lifts is that they cannot be used in the main area of a recreational vehicle or other structure into which a slide-out room is retracted. In many situations, the components of conventional bed lefts interfere with the retraction of the slide-out room. Another problem is that they do not provide the user with enough options to configure the space accordingly.

General Description

A variety of structures are described that can include various configurations of a movable bed. The structures can be mobile or immobile. They can include vehicles such as recreational vehicles and especially toy hauler type recreational vehicles. They can also include buildings, homes, apartments, and the like. The structures can also be any of those described in the incorporated documents.

In some embodiments, the structure includes a bed that moves between a variety of different configurations. For example, in some embodiments, the bed can move between a sleeping configuration where the bed is lowered and oriented horizontally to receive one or more persons to sleep thereon, a stowed configuration where the bed is raised, and a split configuration where a first portion of the bed is lowered and a second portion of the bed is raised. The first and second portions of the bed can each transform into other items of furniture such as a seating unit. For example, in some embodiments, each portion of the bed is a convertible sofa that can selectively form a seating unit or a bed surface.

This embodiment provides a number of advantages. One advantage is that it allows the user to choose whether to use one or both seating units at a given time. One seating unit can be lowered and the other can be stowed in a horizontal or upright position. For example, the user may want to use only one seating unit with a table positioned where the other seating unit would normally be located. In other situations, the user may want to use only one seating unit and leave the space where the other seating unit would normally be located open to provide a more spacious environment in the structure. For example, the user may want more space to move from the front area of a toy-hauler to a back patio formed by a ramp door.

In some embodiments, the bed can move between a sleeping configuration where the bed is lowered and oriented horizontally to receive one or more persons to sleep thereon, a stowed configuration where the bed is raised, a first seating configuration where the bed or a portion of the bed forms a seating unit including a seat base and a seat back and faces one direction, and a second seating configuration where the seating unit faces another direction. In general, the seating unit can be rotated to face any suitable direction. In some embodiments, the direction the seating unit faces in the first seating configuration can be perpendicular or approximately perpendicular to the direction the seating unit faces in the second seating configuration. Likewise, the seating unit can face opposite directions in the first seating configuration and the second seating configuration.

In some embodiments, the bed can include two or more portions that can be converted into seating units. For example, the bed can be converted into seating units positioned opposite each other along the walls of the structure. One or both seating units can be rotated to face the same direction or different directions. For example, in a recreational vehicle, one or both seating units can be rotated to face forward and/or backward.

This embodiment also provides a number of advantages. One advantage is that the user has greater flexibility to customize the configuration of the interior space of the structure. For example, in a recreational vehicle, the user can position both seating units to face forward and create a more comfortable living or gathering area. Likewise, in a toy hauler, the user can rotate one or both seating units to face the back or outside of the vehicle and provide additional seating for viewing outdoor activities.

In some embodiments, the structure can include a slide-out room that moves between a retracted position and an extended position and a vertically movable bed positioned in the area into which the slide-out room retracts. The bed can move between a sleeping configuration where the bed is lowered and oriented horizontally to receive one or more persons to sleep thereon and a stowed configuration where the bed is raised above the height of the slide-out room when it is retracted. For example, in a recreational vehicle, the bed can be in the stowed configuration when the slide-out room is extended and the recreational vehicle is ready to travel. The bed can be moved to the sleeping configuration when the slide-out room is extended and the recreational vehicle is ready for use.

This embodiment also provides a number of advantages. One advantage is that it increases the number of available beds without expanding the size of a structure such as a recreational vehicle. The overall size of the structure can be smaller yet feel bigger and sleep more due to the combination of the vertically movable bed and the slide-out room sharing the same interior space.

A variety of bed lifts are also described that can be used to vertically move the bed in the various structures including moving the bed in any of the ways described above. In some embodiments, the bed can be coupled to the bed lift in a manner that allows the bed to be rotated to face different directions as described above. In some embodiments, this includes rotating the beds at least approximately 90 degrees in either direction.

In some embodiments, the bed lift includes one or more mounting brackets that rotate about a vertical axis to allow the bed or one or more portions of the bed (either in a bed configuration or seating unit configuration) to face various directions. In some embodiments, the bed lift can include multiple lifting assemblies configured to be coupled to the bed with the mounting brackets.

The mounting brackets can have a variety of configurations. In some embodiments, the bed is coupled to a lifting assembly with two mounting brackets. One of the mounting brackets can be configured to rotate about a vertical axis. The other mounting bracket can be configured to selectively decouple the bed from the lifting assembly and couple the bed to the lifting assembly. The bed can be rotated to face different directions by decoupling it from the lifting assembly with the other mounting bracket and rotating it to the desired final position on the vertical axis of the one mounting bracket.

In some embodiments, the bed includes one or more legs coupled to the underside of the bed. The legs can fold, telescope, or extend down to support the bed in the final position. Alternatively, the mounting bracket used to couple the bed to the lifting assembly can be sufficiently strong to support the weight of the bed and those who sit on it.

The bed lift can also include a failsafe stop mechanism configured to prevent unwanted downward movement of the bed. For example, the bed may normally be held in place by a brake that is part of or coupled to an electric motor. The failsafe stop mechanism can be used to prevent the bed from moving unexpectedly downward due to a malfunction of the brake.

In some embodiments, the failsafe stop mechanism is coupled to a guide member positioned vertically in the structure and configured to guide vertical movement of the bed. In some embodiments, the failsafe stop mechanism is configured to only impede downward movement of the bed and allow upward movement of the bed through the failsafe stop mechanism.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which:

FIG. 11 is a front view of the interior of a structure with a vertically movable bed in a sleeping configuration where the bed is lowered and oriented horizontally to receive one or more persons to sleep thereon.

FIG. 12 is a front view of the interior of a structure with a vertically movable bed in a stowed configuration where the bed is raised and oriented horizontally.

FIG. 13 is a front view of the interior of a structure with a vertically movable bed in a stowed configuration where the bed rotated downward from a raised position to an upright position adjacent to the wall of the structure.

FIG. 14 is a front view of the interior of a structure with a vertically movable bed in a stowed configuration where the bed rotated upward from a lowered position to an upright position adjacent to the wall of the structure.

FIG. 15 is a front view of the interior of a structure with a vertically movable bed in a sleeping configuration where the bed includes two portions that are lowered and oriented horizontally to form the bed and receive one or more persons to sleep thereon.

FIG. 16 is a front view of the interior of a structure with a vertically movable bed in a stowed configuration where the bed includes two portions that are rotated upward from a lowered position to an upright position adjacent to the walls of the structure.

FIG. 17 is a front view of the interior of a structure with a vertically movable bed in a stowed configuration where the bed includes two portions that are rotated downward from a raised position to an upright position adjacent to the walls of the structure.

FIG. 18 is a front view of the interior of a structure with a vertically movable bed in a partially stowed configuration where the bed includes one portion in a use configuration where the portion is lowered and oriented horizontally for use and another portion in a stowed configuration where the portion is raised and oriented horizontally.

FIG. 19 is a front view of the interior of a structure with a vertically movable bed in a partially stowed configuration where the bed includes one portion in a use configuration where the portion is lowered and oriented horizontally for use and another portion in a stowed configuration where the portion is rotated downward from a raised position to an upright position adjacent to the wall of the structure.

FIG. 20 is a front view of the interior of a structure with a vertically movable bed in a stowed configuration where the bed includes one portion that is rotated upward from a lowered position to an upright position adjacent to one wall of the structure and another portion that is rotated downward from an intermediate position to an upright position adjacent to another wall of the structure.

FIG. 21 is a front view of the interior of a structure with a vertically movable bed in a partially stowed configuration where the bed includes one portion that is in a use configuration where the portion is lowered and oriented horizontally for use and another portion that is rotated upward from an intermediate position to an upright position adjacent to the wall of the structure.

FIG. 22 is a front view of the interior of a structure with a vertically movable bed in a stowed configuration where the bed includes one portion that is rotated downward from an intermediate position to an upright position adjacent to one wall of the structure and another portion that is rotated downward from a raised position to an upright position adjacent to another wall of the structure.

DETAILED DESCRIPTION OF EMBODIMENTS

Figure 1:
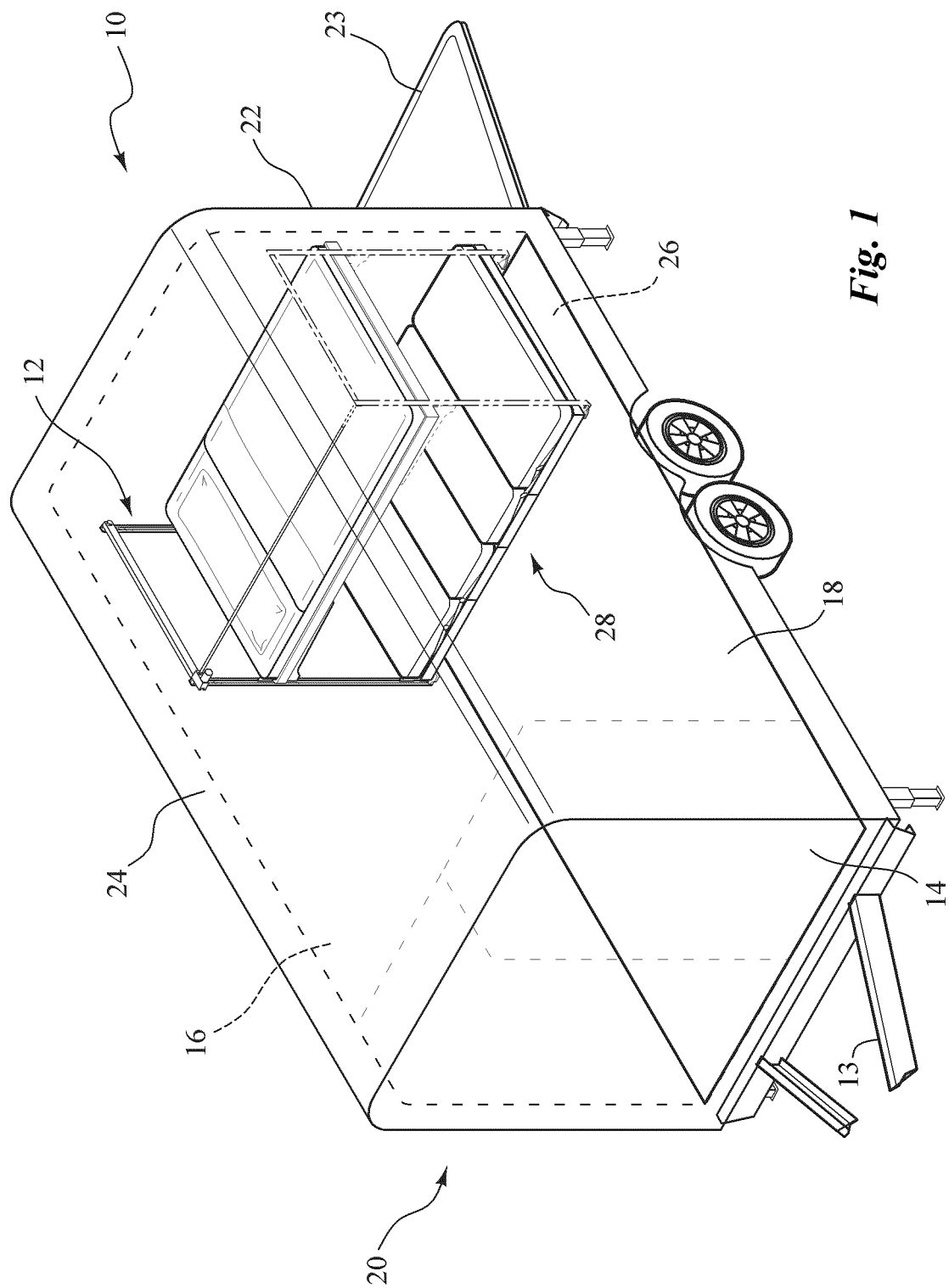
FIG. 1 is a perspective view of one embodiment of a toy hauler recreational vehicle with bunk beds positioned in the cargo area.

FIG. 1 shows one embodiment of a structure that is a toy hauler type recreational vehicle 10 including a bed lift 12 for vertically moving one or more beds 40, 41. The vehicle 10 includes a vehicle body 20 which is coupled to a frame 13. The body 20 includes a front wall 14, a first side wall 16, a second side wall 18 positioned opposite the first side wall 16, a rear wall 22, a ceiling 24, and a floor 26.

The vehicle 10 also includes a cargo area 28 configured to receive and/or transport off-road vehicles (e.g., side-by-side ATVs, four-wheelers, motorcycles, snowmobiles, dune buggies, personal watercraft, and the like) and/or other vehicles (e.g., cars, JEEP type vehicles, and so forth) to various destinations where they are used in recreational activities. The rear wall 22 includes a ramp door 23 that moves between a closed position where the cargo area 28 is closed and an open position where the ramp door 23 forms a ramp that can be used to move off-road vehicles into and/or out of the cargo area 28.

It should be appreciated that the vehicle 10 is but one example of a suitable structure. Other examples of suitable structures include vehicles such as recreational vehicles as well as mobile and immobile structures. They also include any structures described in the incorporated documents listed at the end of the description.

It should be appreciated that some of the subject matter described in this document is the same or similar to the subject matter described in the incorporated documents. Accordingly, the description of such subject matter in the incorporated documents applies equally to the same or similar subject matter in this document.

Referring to FIGS. 2-10, the bed lift 12 includes lifting assemblies 30a, 30b, 30c, 30d (collectively or generically referred to as "lifting assemblies 30"), a drive member 34, cross members 32, and a motor assembly 36. The lifting assemblies 30a, 30c are coupled to the first side wall 16 of the vehicle 10, and the lifting assemblies 30b, 30d are coupled to the second side wall 18. The cross members 32 connect each pair of lifting assemblies 30 on each side wall 16, 18.

The bed lift 12 is used to vertically move one or more beds 40, 41 (a first or lower bed 40 and a second or upper bed 41) between various configurations. The beds 40, 41 are coupled to the bed lift 12 with mounting brackets 42, 44, respectively. The mounting brackets 42, 44 can be fixed or can be configured to rotate upward, downward, and/or sideways.

It should be appreciated that although two beds 40, 41 are shown in the FIGS., the bed lift 12 can be used to lift one bed or more than two beds. Also, the beds 40, 41 do not necessarily need to be positioned adjacent to the ceiling 24 in the stowed configuration. For example, the beds 40, 41 may be stowed in a structure having a ceiling that is much higher than the raised position of the beds 40, 41.

The bed lift 12 can also be used to move the beds 40, 41 reciprocally and translationally (or approximately translationally) between the various configurations. Translational movement refers to motion of a body where every point of the body moves parallel to and the same distance as every other point of the body. The lifting assemblies 30 can also be used to move one or more of the beds 40, 41 in a manner that does not qualify as translational movement. For example, one or both beds 40, 41 can be configured to rotate while moving between the various configurations.

It should be appreciated that the bed lift 12 can be substituted for any of the other bed lifts described in the incorporated documents. Likewise, it is also possible to use one of the other bed lifts described in the incorporated documents and modify it to include the features and/or advantages described in connection with the bed lift 12. Accordingly, it is possible to create a wide variety of structures having a wide variety of bed lifts and/or movable beds.

FIGS. 2-10 illustrate some of the bed/couch configurations that can be achieved using the bed lift 12 in the vehicle 10. In general, the bed lift 12 can be used to move the beds 40, 41 between any combination of the configurations shown in FIGS. 2-10. The lower bed 40 is divided into a first portion 46 coupled to the first side wall 16 and a second portion 48 coupled to the second side wall 18.

It should be appreciated that the upper bed 41 can also be divided into portions and/or both beds 40, 41 can be undivided beds spanning between the side walls 16, 18. It should also be appreciated that the bed 40 can be divided into different sized portions such as 60/40 or 70/30. Each of these portions can move in any of the same ways as the 50/50 portions.

The portions 46, 48 of the lower bed 40 can move between a variety of positions and configurations. For example, the portions 46, 48 can rotate downward or upward from a horizontal orientation to an upright orientation adjacent to the side walls 16, 18. Likewise, the portions 46, 48 can move between a flat configuration and a seating configuration where each portion includes a seat base 70 and a seat back 72.

Figure 2:
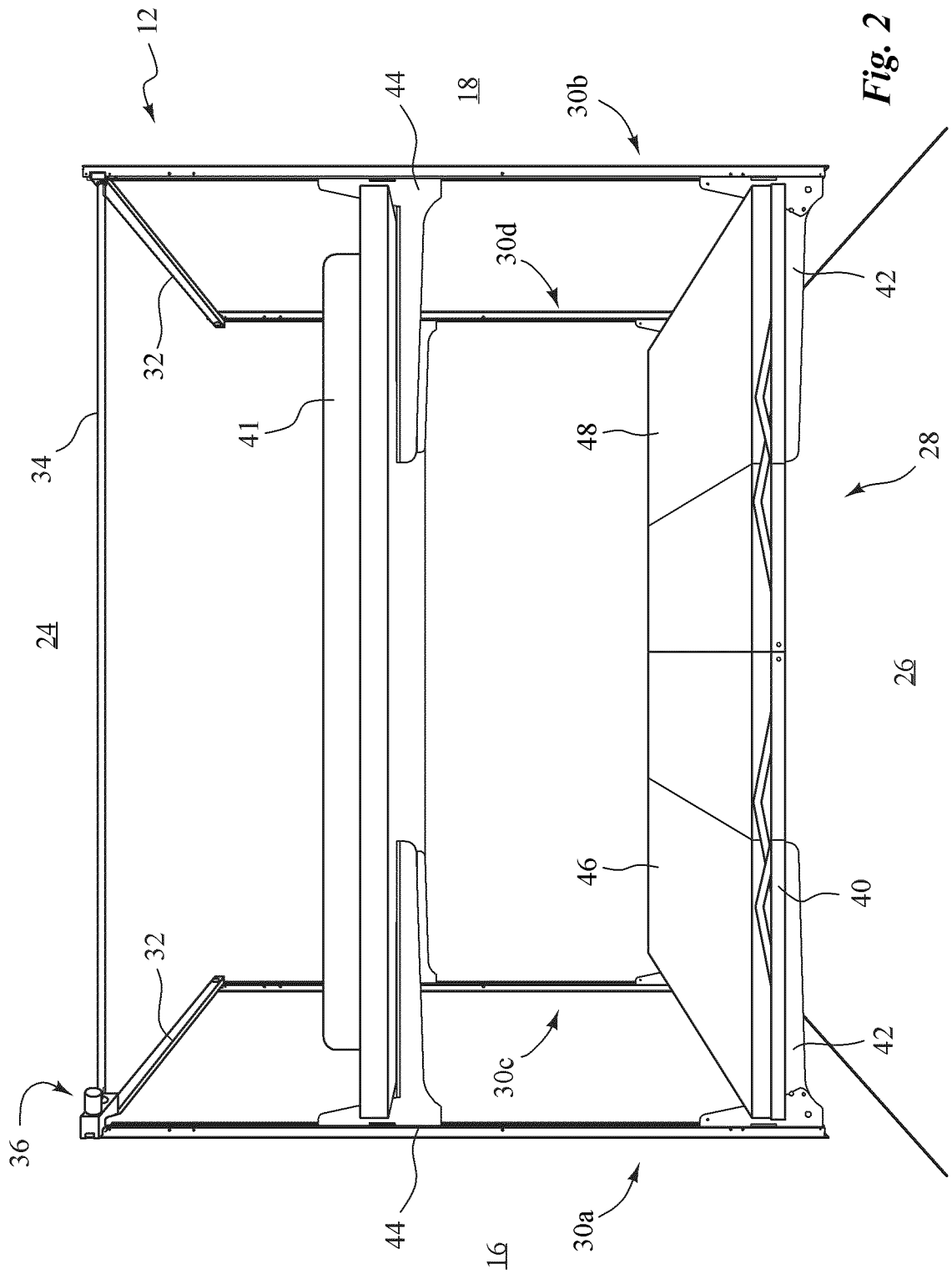
FIG. 2 is a perspective view of the interior of the toy hauler in FIG. 1 with the bunk beds in a sleeping configuration where the beds are lowered and oriented horizontally to receive one or more persons to sleep thereon.
Figure 3:
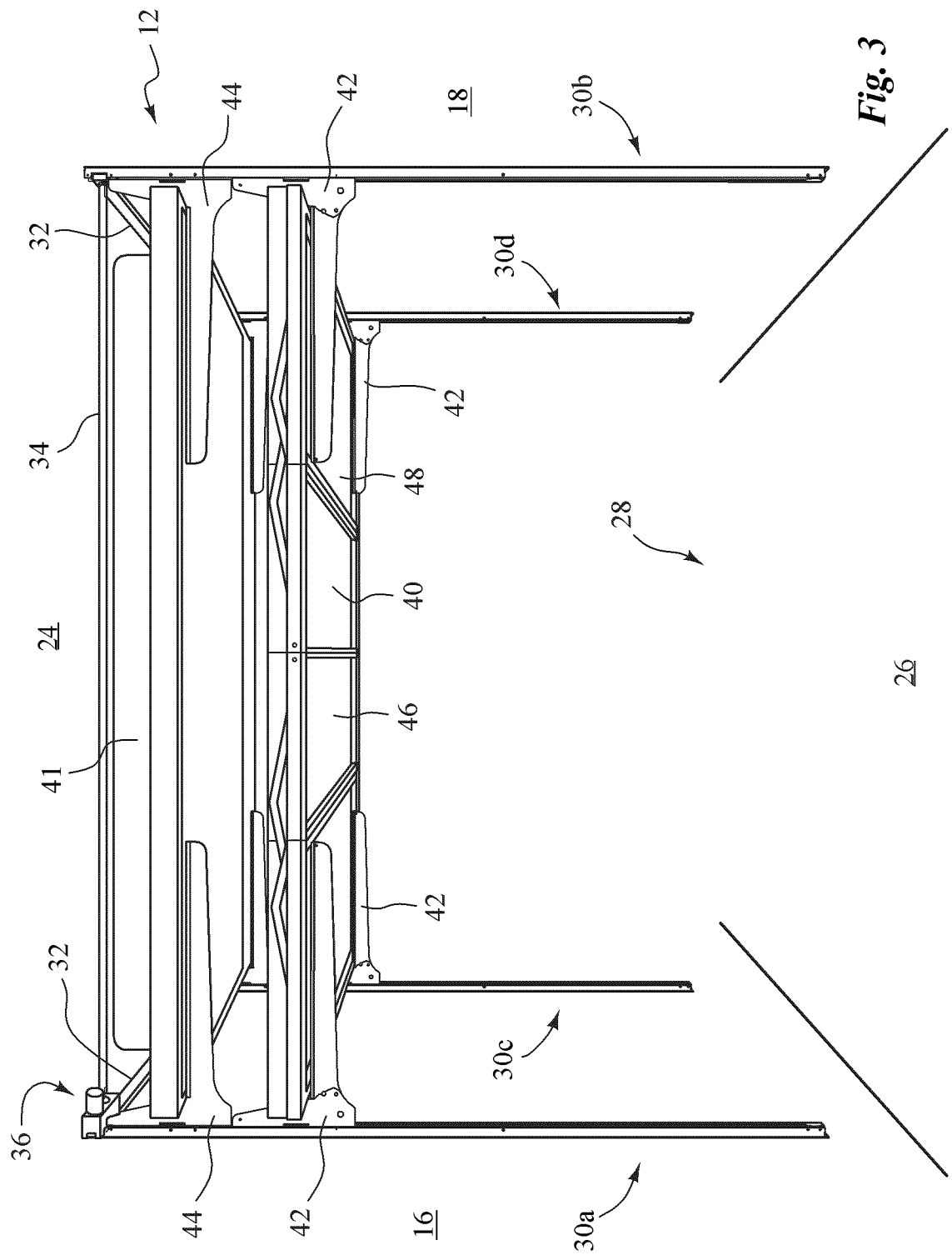
FIG. 3 is a perspective view of the interior of the toy hauler in FIG. 1 with the bunk beds in a raised position where the beds are oriented horizontally and stowed adjacent to the ceiling of the vehicle.

FIG. 2 shows the beds 40, 41 in a sleeping configuration where the beds 40, 41 are lowered and oriented horizontally to receive one or more persons to sleep thereon. FIG. 3 shows the beds 40, 41 in a stowed configuration where the beds 40, 41 are raised and oriented horizontally adjacent to the ceiling 24 of the vehicle 10.

Figure 4:
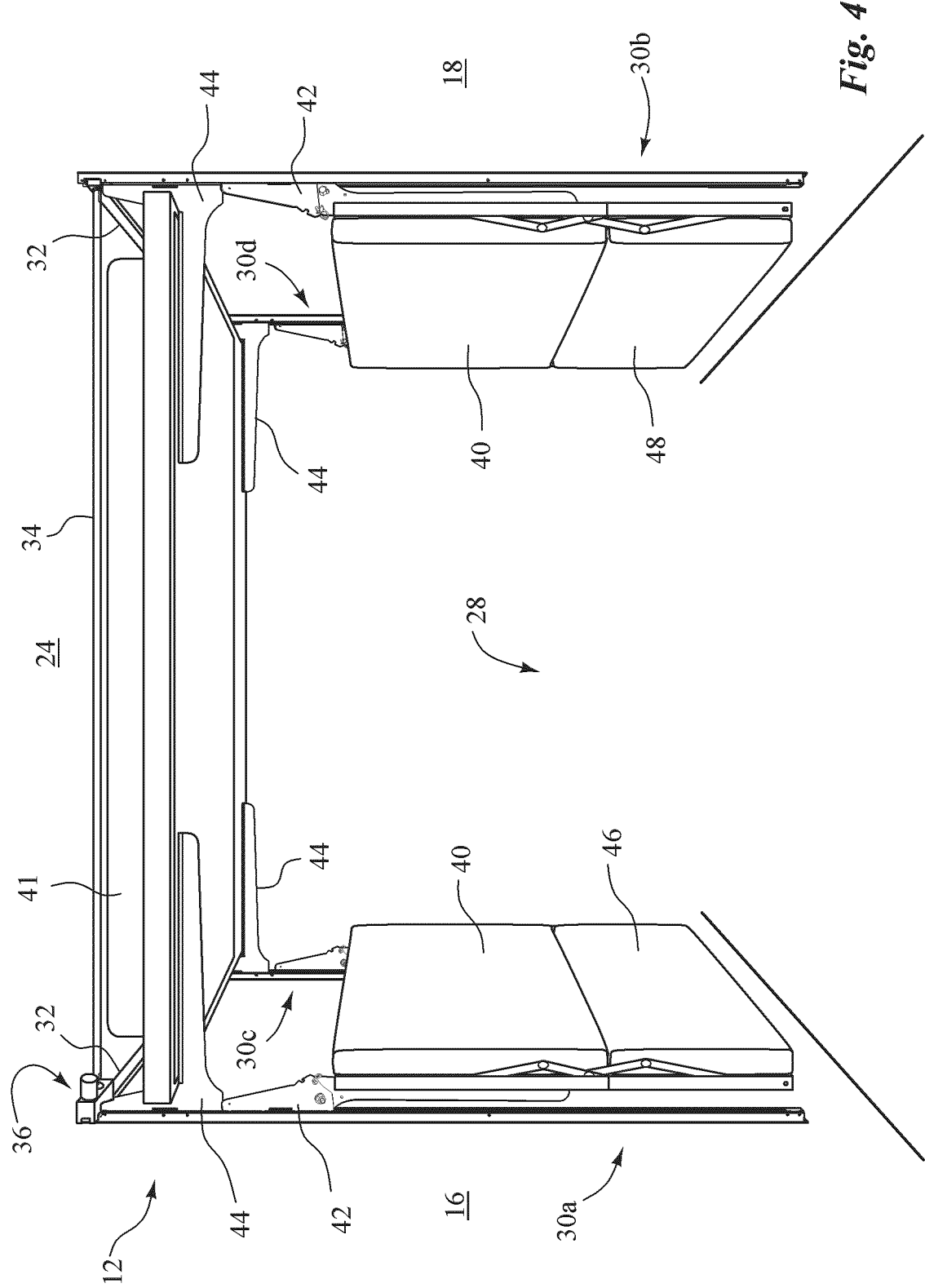
FIG. 4 is a perspective view of the interior of the toy hauler in FIG. 1 with the bunk beds in a partially stowed position where the lower bed is an upright position so that at least a portion of the lower bed is oriented vertically and stowed adjacent to the walls of the vehicle and the upper bed is oriented horizontally and stowed adjacent to the ceiling of the vehicle.

FIG. 4 shows the beds 40, 41 in a stowed configuration. The upper bed 41 is raised and oriented horizontally adjacent to the ceiling 24 of the vehicle 10. The first portion 46 and the second portion 48 are in an upright position adjacent to the side walls 16, 18. The portions 46, 48 rotate downward from a raised position to the upright position. This configuration is especially suitable for providing additional overhead clearance inside the vehicle 10 to accommodate tall off-road vehicles and the like.

The mounting brackets 42 can be configured to allow the portions 46, 48 to rotate upward or downward to the upright position. The mounting brackets 42 can have any suitable configuration. In some embodiments, the mounting brackets 42 are configured in any of the ways described in the incorporated documents.

Figure 5:
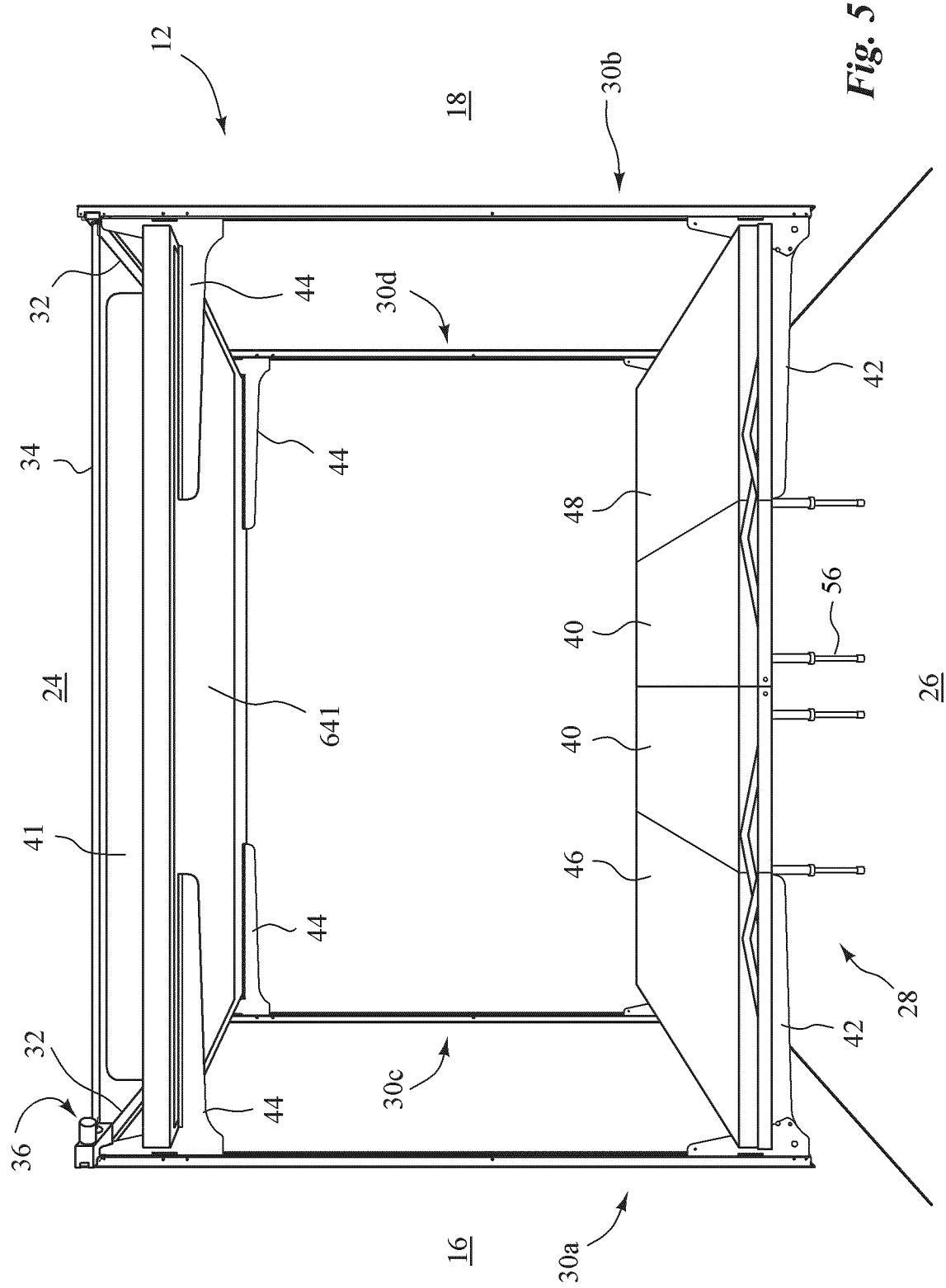
FIG. 5 is a perspective view of the interior of the toy hauler in FIG. 1 with the bunk beds in a partially stowed position where the lower bed is oriented horizontally and positioned to receive one or more persons to sleep thereon and the upper bed is oriented horizontally and stowed adjacent to the ceiling of the vehicle.

FIG. 5 shows the beds 40, 41 in a partially stowed configuration. The upper bed 41 is in a stowed configuration where the bed 41 is raised and oriented horizontally adjacent to the ceiling 24 of the vehicle 10. The lower bed 40 is in a sleeping configuration where the bed 40 is lowered and oriented horizontally to receive one or more persons to sleep thereon. This configuration is useful in situations where the user wants to use the lower bed 40 but does not want to use the upper bed 41. The upper bed 41 can be left in the stowed configuration to provide more room above the lower bed 40, which makes it easier to get into and out of the lower bed 40.

Figure 6:
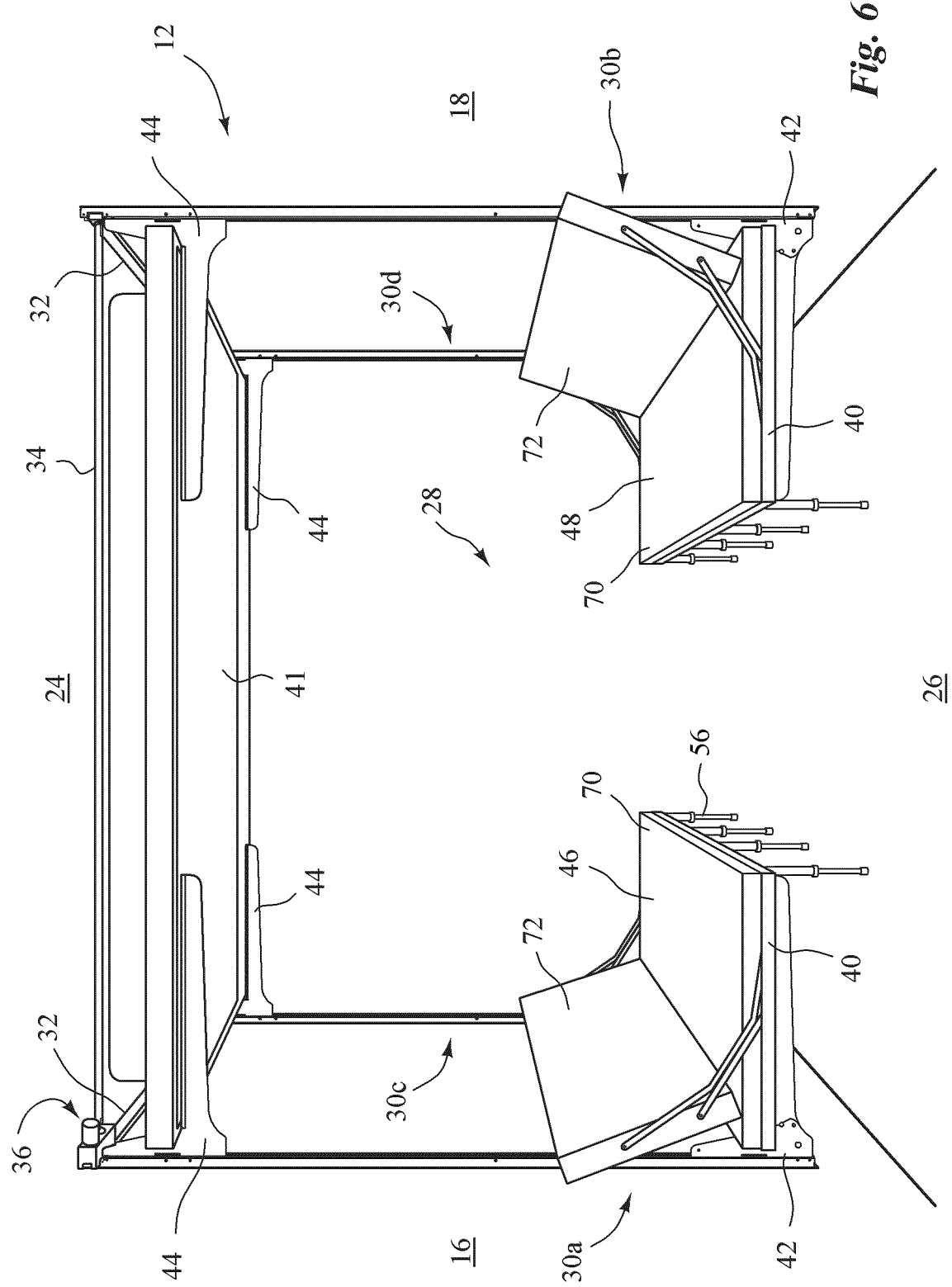
FIG. 6 is a perspective view of the interior of the toy hauler in FIG. 1 with the bunk beds in a partially stowed position where the lower bed forms two opposing seating units each of which have a seat base and a seat back and the upper bed is oriented horizontally and stowed adjacent to the ceiling of the vehicle.

FIG. 6 shows the beds 40, 41 in another partially stowed configuration. The upper bed 41 is in the stowed configuration shown in FIG. 5. However, each portion 46, 48 of the lower bed 40 is converted into a seating unit having a seat base 70 and a seat back 72. The seating units face each other and the side walls 16, 18. The seating units are separated by an aisle that is parallel to the lengthwise direction of the vehicle 10.

It should be appreciated that the lower bed 40 can form one, two, or more seating units in the seating configuration. For example, in some embodiments, the lower bed 40 forms a single seating unit positioned adjacent to one of the sidewalls 16, 18. In these embodiments, the entire lower bed 40 is used to form the seating unit. In other embodiments, the lower bed 40 forms multiple seating units configured in a variety of ways including that shown in FIG. 6. The lower bed 40 can also have any seating configuration described in the incorporated documents.

The lower bed 40 can move between the flat configuration and the seating configuration in a variety of ways. In some embodiments, the entire lower bed 40 and/or each portion 46, 48 are roll over sofas that convert into a seating unit using a rollover hinge. In other embodiments, the lower bed 40 and/or each portion 46, 48 convert into a seating unit by rotating the seat back 72 upward relative to the seat base 70. The lower bed 40 and/or each portion 46, 48 can convert into a seating unit in any of the ways described in the incorporated documents.

Figure 7:
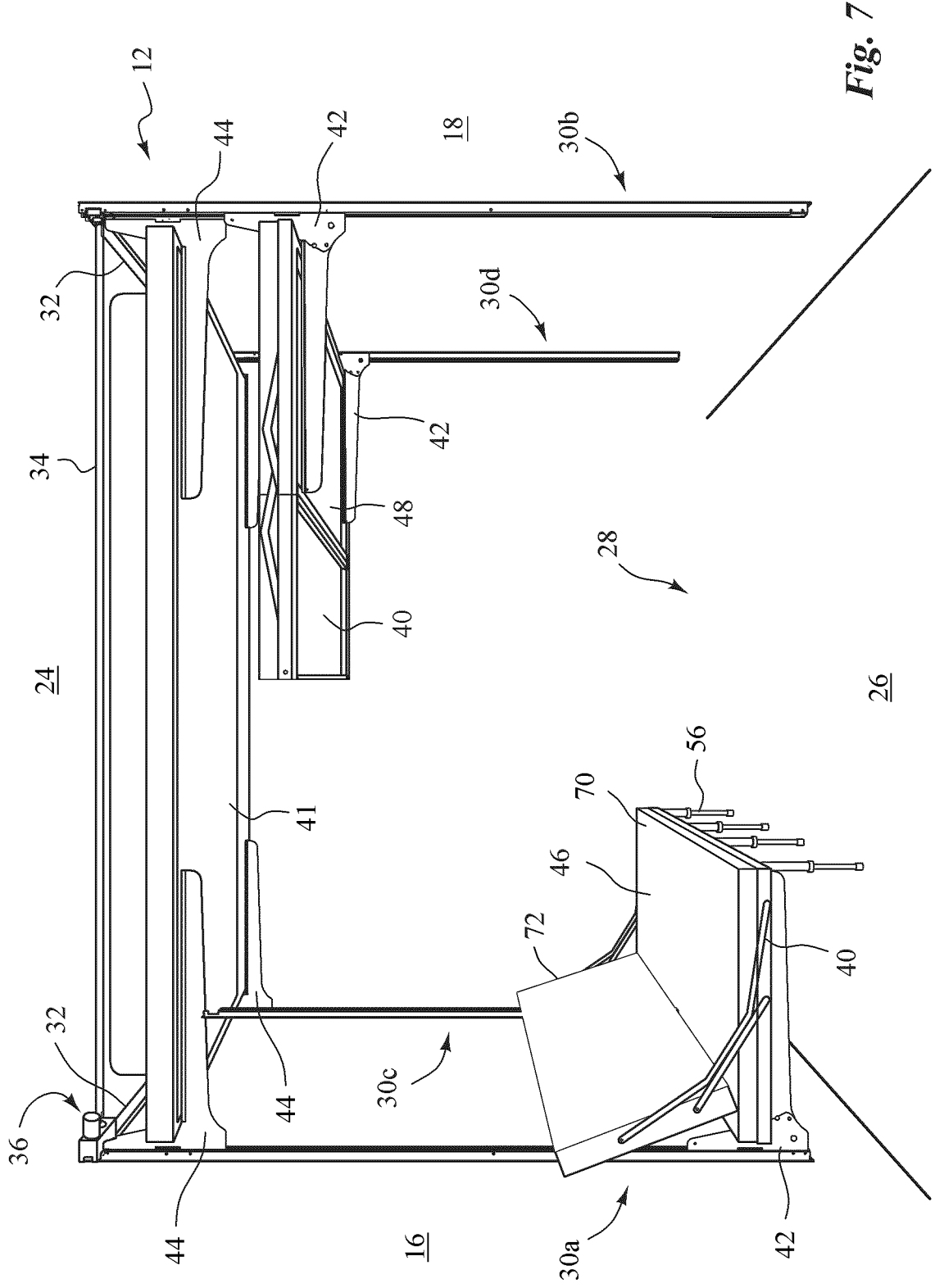
FIG. 7 is a perspective view of the interior of the toy hauler in FIG. 1 with the bunk beds in a partially stowed position where the lower bed is in a split configuration and the upper bed is oriented horizontally and stowed adjacent to the ceiling of the vehicle. One portion of the lower bed forms a seating unit having a seat base and a seat back and the other portion of the lower bed is oriented horizontally and stowed adjacent to the ceiling of the vehicle.

FIG. 7 shows the beds 40, 41 in another partially stowed configuration. The upper bed 41 is in a stowed configuration where the bed 41 is raised and oriented horizontally adjacent to the ceiling 24 of the vehicle 10. The first portion 46 of the lower bed 40 forms a seating unit positioned adjacent to the side wall 16 and oriented parallel to the lengthwise direction of the vehicle 10. The second portion 48 is in a stowed configuration where the portion 48 is raised and oriented horizontally underneath the upper bed 41.

Figure 8:
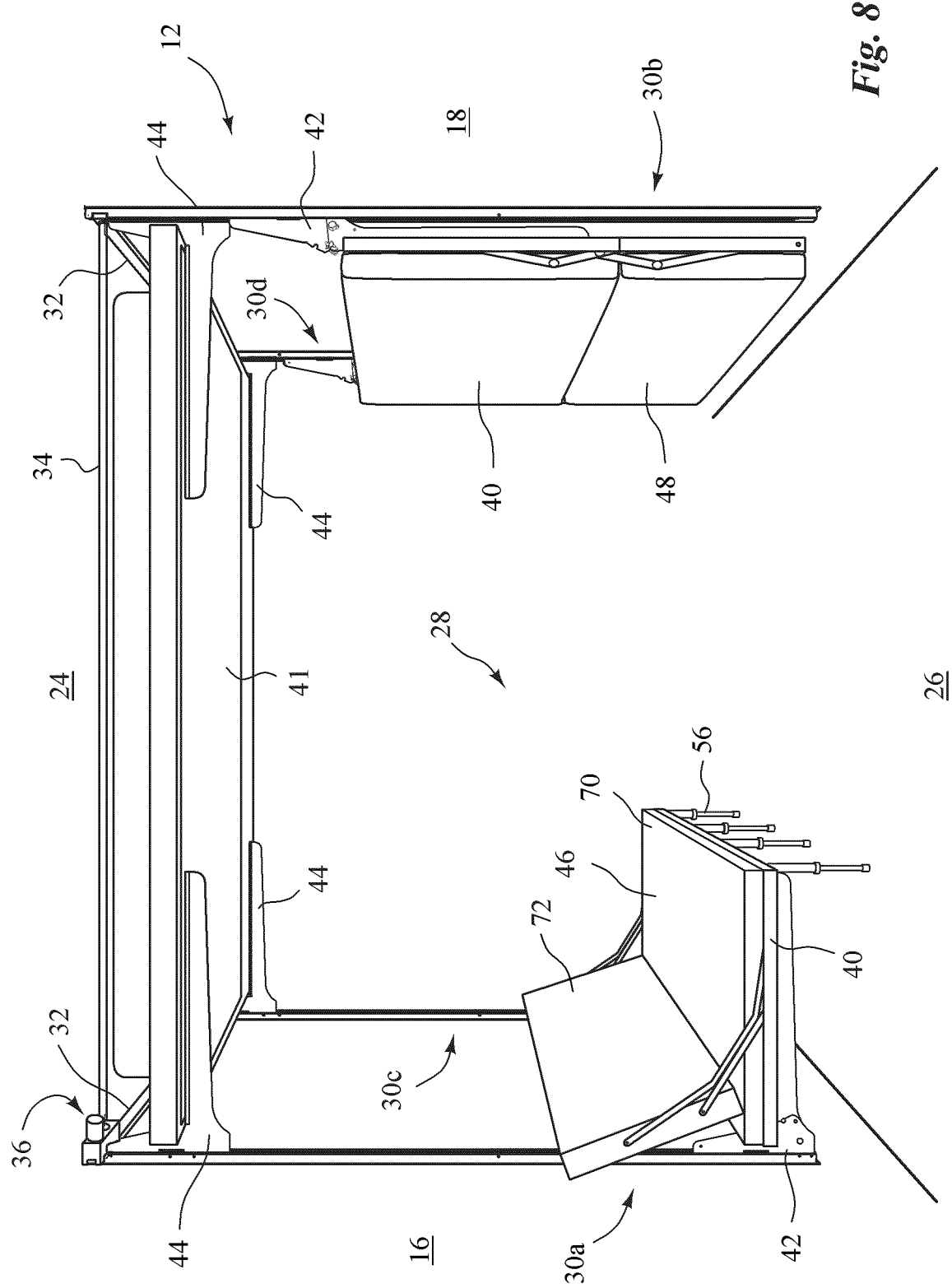
FIG. 8 is a perspective view of the interior of the toy hauler in FIG. 1 with the bunk beds in a partially stowed position where the lower bed is in a split configuration and the upper bed is oriented horizontally and stowed adjacent to the ceiling of the vehicle. One portion of the lower bed forms a seating unit having a seat base and a seat back and the other portion of the lower bed is in an upright position and stowed adjacent to a wall of the vehicle.

FIG. 8 shows the beds 40, 41 in another partially stowed configuration. This configuration is the same as FIG. 7 except the second portion 48 of the lower bed is stowed in an upright position adjacent to the side wall 18. The second portion 48 moves to the upright position by rotating the second portion 48 downward from the position shown in FIG. 7. This configuration provides more clearance under the upper bed 41 while the configuration in FIG. 7 provides more space from side-to-side.

Figure 9:
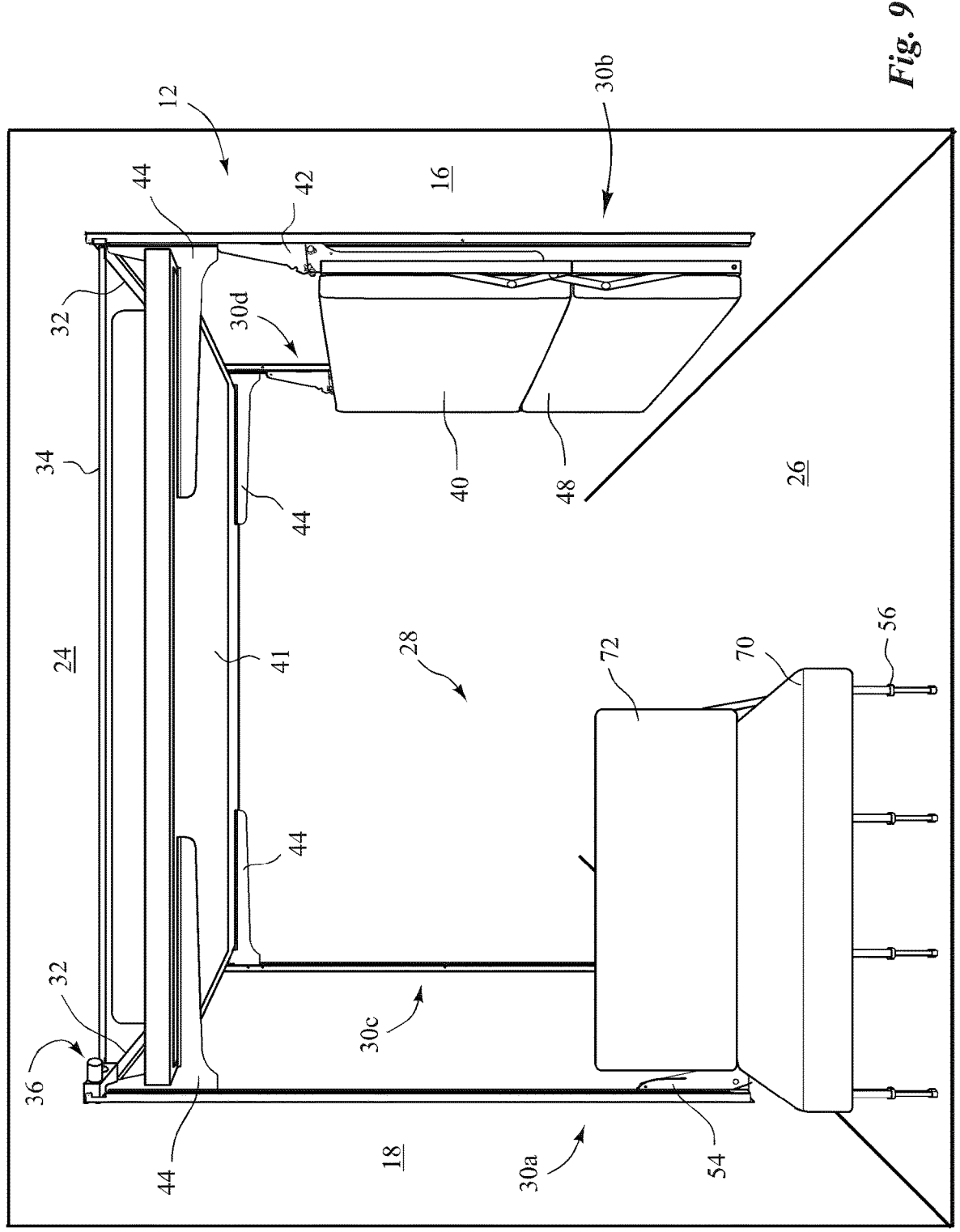
FIG. 9 is a perspective view of the interior of the toy hauler in FIG. 8 with the seating unit rotated 90 degrees or approximately 90 degrees to face the exterior or rear of the toy hauler.

FIG. 9 shows the beds 40, 41 in another partially stowed configuration. This configuration is the same as FIG. 8 except the seating unit formed by the first portion 46 of the lower bed 40 is decoupled from the third lifting assembly 30c and rotated approximately 90 degrees at the first lifting assembly 30a until it is oriented perpendicular to the lengthwise direction of the vehicle 10. The seating unit faces the ramp door 22 of the vehicle 10. The user can open the ramp door 22, sit on the seating unit, and observe the outdoors. In some embodiments, the vehicle 10 is configured to form an outdoor patio with the ramp door 22. The seating unit can face the patio and provide additional seating.

Figure 10:
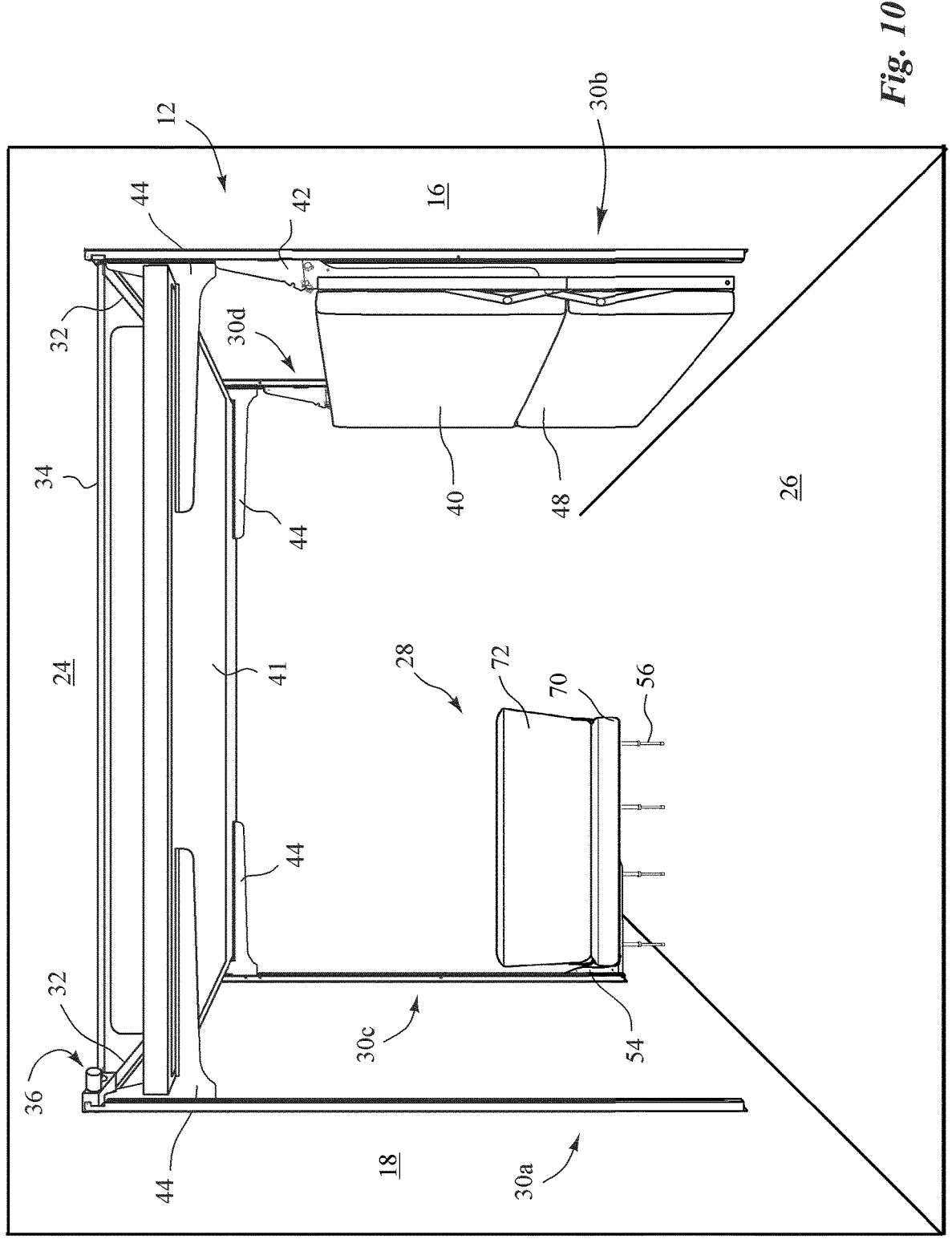
FIG. 10 is a perspective view of the interior of the toy hauler in FIG. 8 with the seating unit rotated 90 degrees or approximately 90 degrees to face the interior or front of the toy hauler.

FIG. 10 shows the beds 40, 41 in another partially stowed configuration. This configuration is the same as FIG. 9 except the seating unit formed by the first portion 46 of the lower bed 40 is decoupled from the first lifting assembly 30a and rotated approximately 90 degrees at the third lifting assembly 30c until it is oriented perpendicular to the lengthwise direction of the vehicle 10. In this configuration, the seating unit faces the interior or front of the vehicle 10. The seating unit can be used to form a tighter seating group in the interior of the vehicle 10.

The lower bed 40 can be coupled to the lifting assemblies 30 in any suitable manner that allows the lower bed 40 and/or the portions 46, 48 to be selectively decoupled from and coupled to the lifting assemblies 30 and/or rotated about a vertical axis as shown in FIGS. 9-10. For example, the lower bed can be coupled to the lifting assemblies 30 with mounting brackets 54. The mounting brackets 54 can be configured to be selectively decoupled from and coupled to the lifting assemblies 30. The mounting brackets 54 can also be configured to rotate about a vertical axis to allow the seating units to rotate any desired amount including to the positions shown in FIGS. 9-10.

The seating unit can be supported in any suitable manner. For example, in some embodiments, the seating unit can be supported by legs 56 that are coupled to the underside of the seat base 70. The legs 56 can rotate or extend downward and contact the floor 24 of the vehicle 10. In other embodiments, the seating unit can be supported solely by the mounting bracket 54. For example, the mounting bracket 54 can be sized to support the weight of multiple people sitting on the seating unit without being supported by the floor 24.

FIGS. 11-22 show additional configurations of the lower bed 40 in the vehicle 10. FIG. 11 shows the lower bed 40 in a sleeping configuration where the lower bed 40 is lowered and oriented horizontally to receive one or more persons to sleep thereon. The lower bed 40 is a single undivided unit.

FIG. 12 shows the lower bed 40 in a stowed configuration where the lower bed 40 is raised and oriented horizontally. FIG. 13 shows the lower bed 40 in a stowed configuration where the bed 40 is positioned upright adjacent to the side wall 18. The lower bed 40 moves to the upright position by raising the bed 40 and rotating it downward. FIG. 14 shows the lower bed 40 in a stowed configuration where the bed 40 is positioned upright adjacent to the side wall 18. In this embodiment, the lower bed 40 moves to the upright position by lowering the bed 40 and rotating it upward.

FIG. 15 shows the lower bed 40 in the sleeping configuration shown in FIG. 11. FIG. 15 differs from FIG. 11 in that the lower bed 40 is divided in portions 46, 48. FIG. 16 shows the lower bed 40 in a stowed configuration where the portions 46, 48 are positioned upright adjacent to the side walls 16, 18, respectively. In this embodiment, the portions 46, 48 rotate upward to the upright position.

FIG. 17 shows the lower bed 40 in another stowed configuration where the portions 46, 48 are positioned upright adjacent to the side walls 16, 18. In this embodiment, the portions 46, 48 rotate downward to the upright position.

FIG. 18 shows the lower bed 40 in a partially stowed configuration. The portion 46 is shown in a sleeping or use configuration where the portion 46 is lowered and oriented horizontally to receive one or more persons to sit or sleep thereon. The portion 48 is shown in a stowed configuration where the portion 48 is raised and oriented horizontally.

FIG. 19 shows the lower bed 40 in a partially stowed configuration similar to FIG. 18 except the portion 48 is in an upright position adjacent to the side wall 18. The portion 48 rotates downward from the raised position to the upright position.

FIG. 20 shows the lower bed 40 in a stowed configuration where the portions 46, 48 are positioned upright adjacent to the side walls 16, 18, respectively. The portion 46 rotates upward from a lowered position to the upright position. The portion 48 is positioned at an intermediate location approximately halfway up the lifting assembly 30. The portion 48 rotates downward to the upright position.

FIG. 21 shows the lower bed in a partially stowed configuration. The portion 46 is shown in a sleeping or use configuration where the portion 46 is lowered and oriented horizontally to receive one or more persons to sit or sleep thereon. The portion 48 is positioned at an intermediate location a little over halfway up the lifting assembly 30. The portion 48 rotates upward to the upright position.

FIG. 22 shows the lower bed 40 in a stowed configuration where the portions 46, 48 are positioned upright adjacent to the side walls 16, 18, respectively. The portion 46 is positioned at an intermediate location a little less than halfway up the lifting assembly 30. The portion 46 rotates downward to the upright position. The portion 48 is positioned upright adjacent to the side wall 18. The portion 48 rotates downward from the raised position to the upright position.

Figure 23:
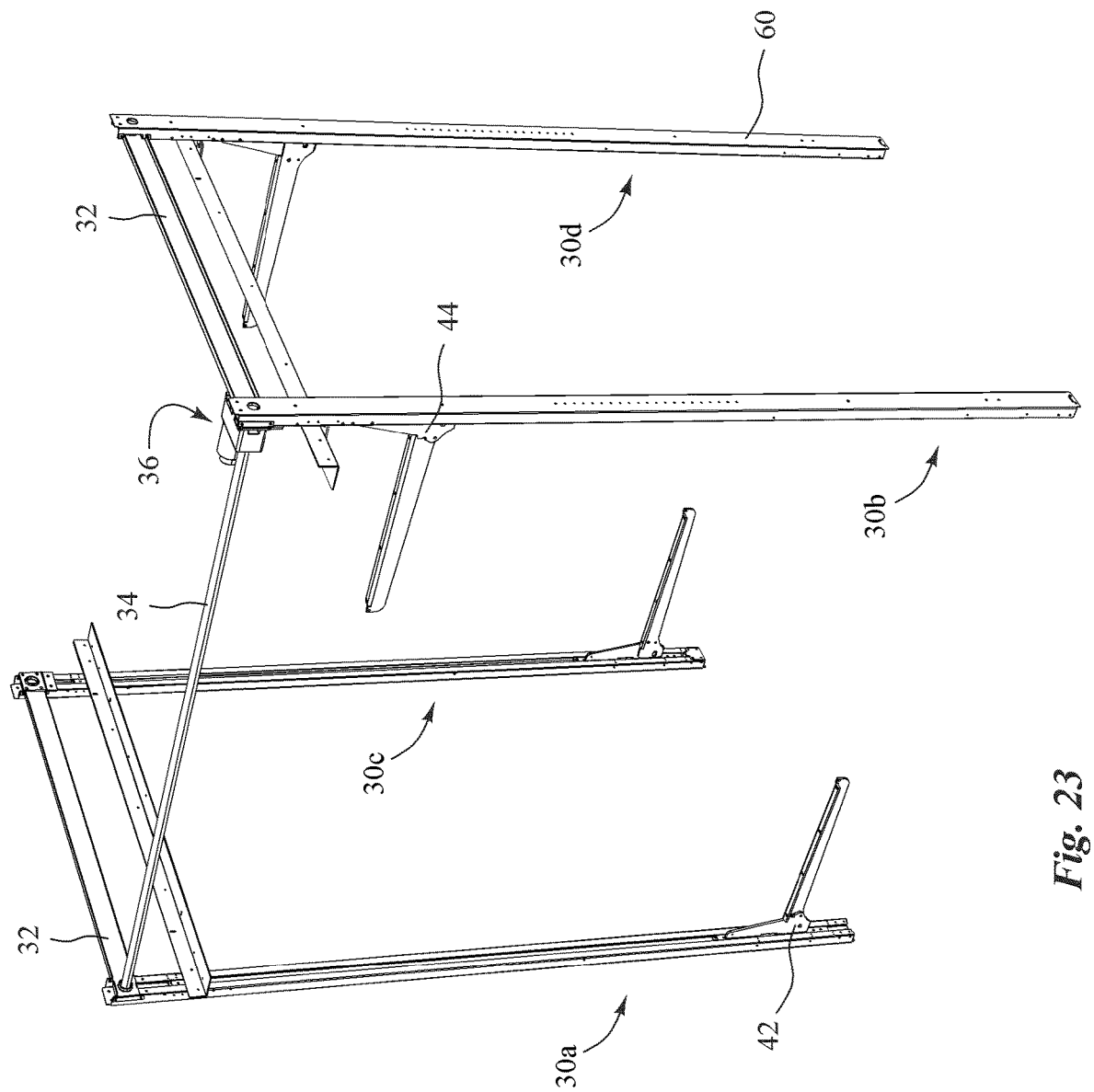
FIGS. 23-24 are perspective views of one embodiment of a bed lift that can be used to move the bunk beds to the position shown in FIG. 7.
Figure 24:
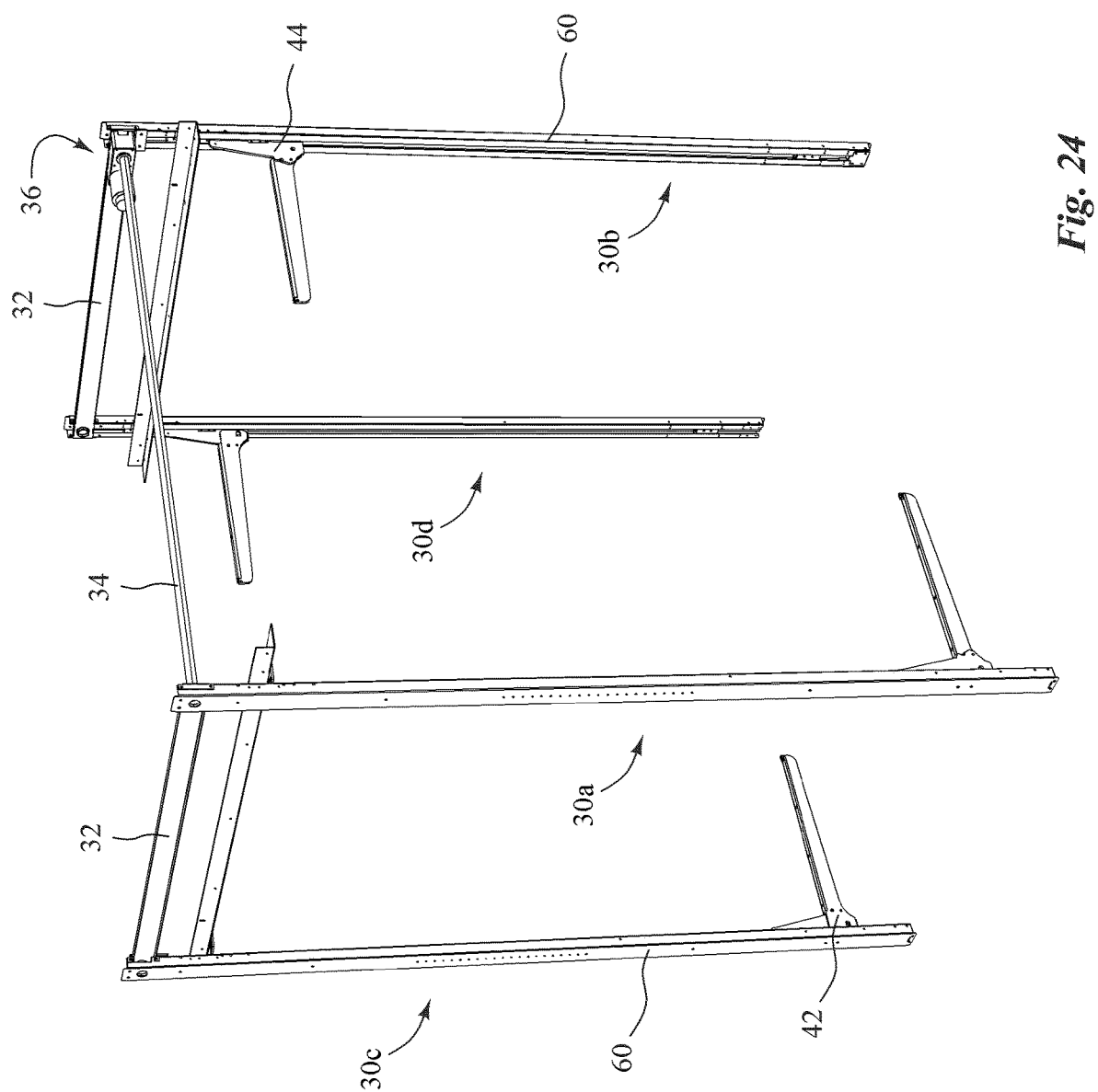
Figure 25:
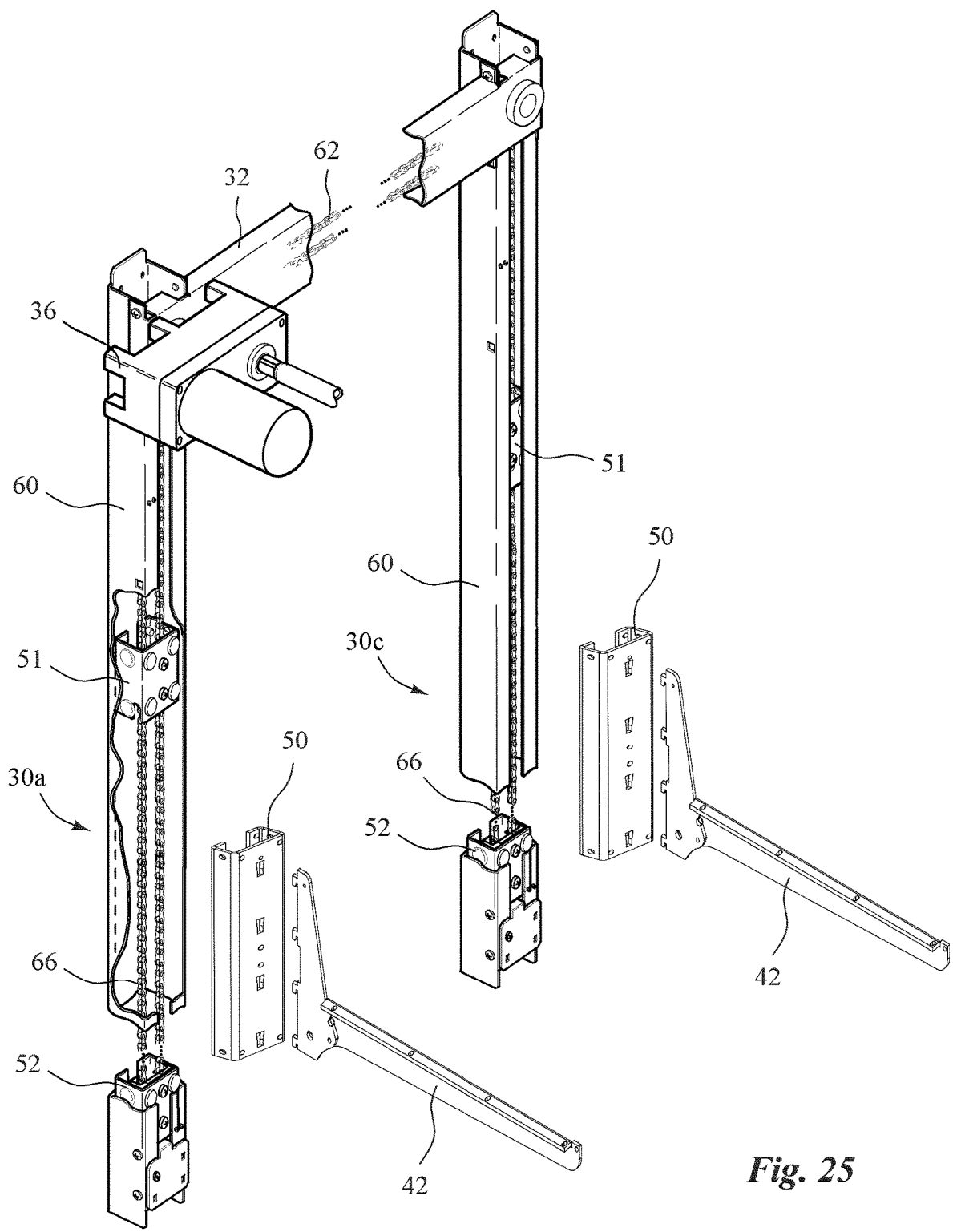
FIG. 25 is a partially cut-away perspective view of one embodiment of one half of the bed lift shown in FIGS. 23-24.

It should be appreciated that the bed lift 12 can have any suitable configuration capable of moving the beds 40, 41 between the configurations shown described above and shown in FIGS. 2-22. FIGS. 23-25 show perspective views of one embodiment of the bed lift 12 capable of moving the beds 40, 41 in the manner described above and shown in FIGS. 2-22.

The bed lift 12 includes four lifting assemblies 30a, 30b, 30c, 30d, a drive member 34, cross members 32, and a motor assembly 36. One cross member 32 is coupled between the top of the lifting assemblies 30a, 30c and another cross member 32 is coupled between the top of the lifting assemblies 30b, 30d. The cross members 32 conceal a flexible drive member 62 that synchronizes movement of the adjacent lifting assemblies 30a, 30c and 30b, 30d. The drive member 34 synchronizes movement of the pair of lifting assemblies 30a, 30c coupled to the first side wall 16 and the pair of lifting assemblies 30b, 30d coupled to the second side wall 18. The motor assembly 36 drives movement of the lifting assemblies 30.

Referring to FIG. 25, each lifting assembly 30 includes a lower trolley 50 (alternatively referred to as a moving assembly or moving member), an upper trolley 51 (alternatively referred to as a moving assembly or moving member), a drive trolley 52 (alternatively referred to as a moving assembly, moving member, or drive carriage), and a guide member 60 (alternatively referred to as a guide rail).

Each lifting assembly 30*a*, 30*b*, 30*c*, 30*d* also includes a flexible drive member 66 coupled to the drive trolley 52. The flexible drive members 66 are used to vertically move the drive trolleys 52 in cooperation with the guide members 60. In some embodiments, the flexible drive members 66 form endless loops and the drive trolleys 52 are coupled to one side of the endless loops so that the drive trolleys 52 move up and down in unison.

It should be appreciated that the flexible drive members 62, 66 can be any suitable type of flexible component. In some embodiments, the flexible drive members 62, 66 include a chain such as a roller chain that wraps around one or more chain sprockets.

The lower trolleys 50 are coupled to the lower bed 40 and the upper trolleys 51 are coupled to the upper bed 41. The trolleys 50, 51 cooperate with the guide members 60 to vertically move the beds 40, 41 between the various positions and configurations described above. In one embodiment, the trolleys 50, 51 slidably cooperate with the guide members 60 to vertically move the beds 40, 41.

In some embodiments, the trolleys 50, 51 are not coupled to the drive trolleys 52. Instead, the trolleys 50, 51 are configured to move freely along the guide members 60. The drive trolleys 52 lift the trolleys 50, 51 by contacting the bottom of the trolleys 50, which then contact the bottom of the trolleys 51. In other embodiments, the lower trolley 50 can be the drive trolley.

Allowing the trolleys 50, 51 to move independently of the drive trolley 52 provides a number of advantages. One advantage is that the trolleys 50, 51 and/or the beds 40, 41 can be held in any position above the drive trolley 52. For example, the trolleys 50, 51 can be held in a raised position by a removable pin or other fastening device. Additional methods and devices that can be used to hold the trolleys 50, 51 and/or beds 40, 41 in a raised position are described in the incorporated documents.

In those situations where one or more of the beds 40, 41 is divided into portions, the portions can be configured to move independently of each other in a vertical direction. This makes it possible to move the beds 40, 41 between a variety of different positions. For example, the beds 40, 41 can move between the lowered position, the raised position, the upright position, the partially stowed position, and/or a split position where one portion 46, 48 is in the lowered position and the other portion 46, 48 is in the raised position.

The trolleys 50, 51 are coupled to the beds 40, 41 with the mounting brackets 42, 44, respectively. In some embodiments, the trolleys 50, 51 are coupled to the mounting brackets 42 in a readily releasable manner. An example of such a configuration is shown in FIG. 25. The mounting brackets 42 include tabs received by corresponding openings in the trolleys 50. Alternatively, the mounting brackets can be affirmatively fastened to the trolleys 50, 51.

The guide members 60 are coupled to the side walls 16, 18 of the vehicle 10 in a vertical orientation. The trolleys 50, 51, 52 are coupled to the guide members 60 in a manner that allows them to move vertically relative to the guide members 60. In one embodiment, the guide members 60 define a channel sized to slidably receive the trolleys 50, 51, 52. For example, the guide members 60 can have a C-shaped cross section that forms the channel and slidably receives the trolleys 50, 51, 52.

Figure 26:
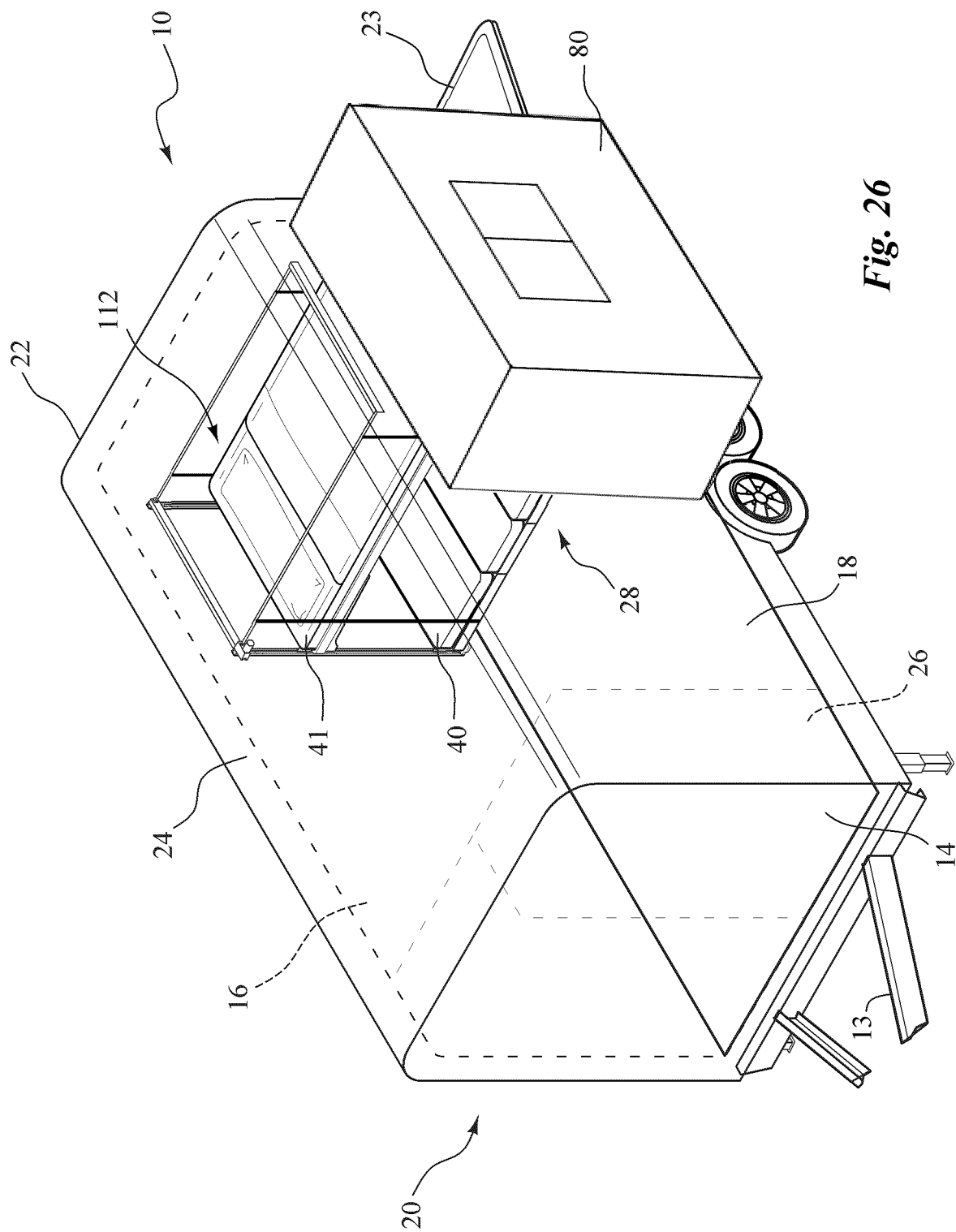
FIG. 26 is a perspective view of one embodiment of a recreational vehicle with bunk beds and a slide-out room where the bunk beds are position in the area into which the slide-out room retracts. The slide-out room is extended in FIG. 26.
Figure 27:
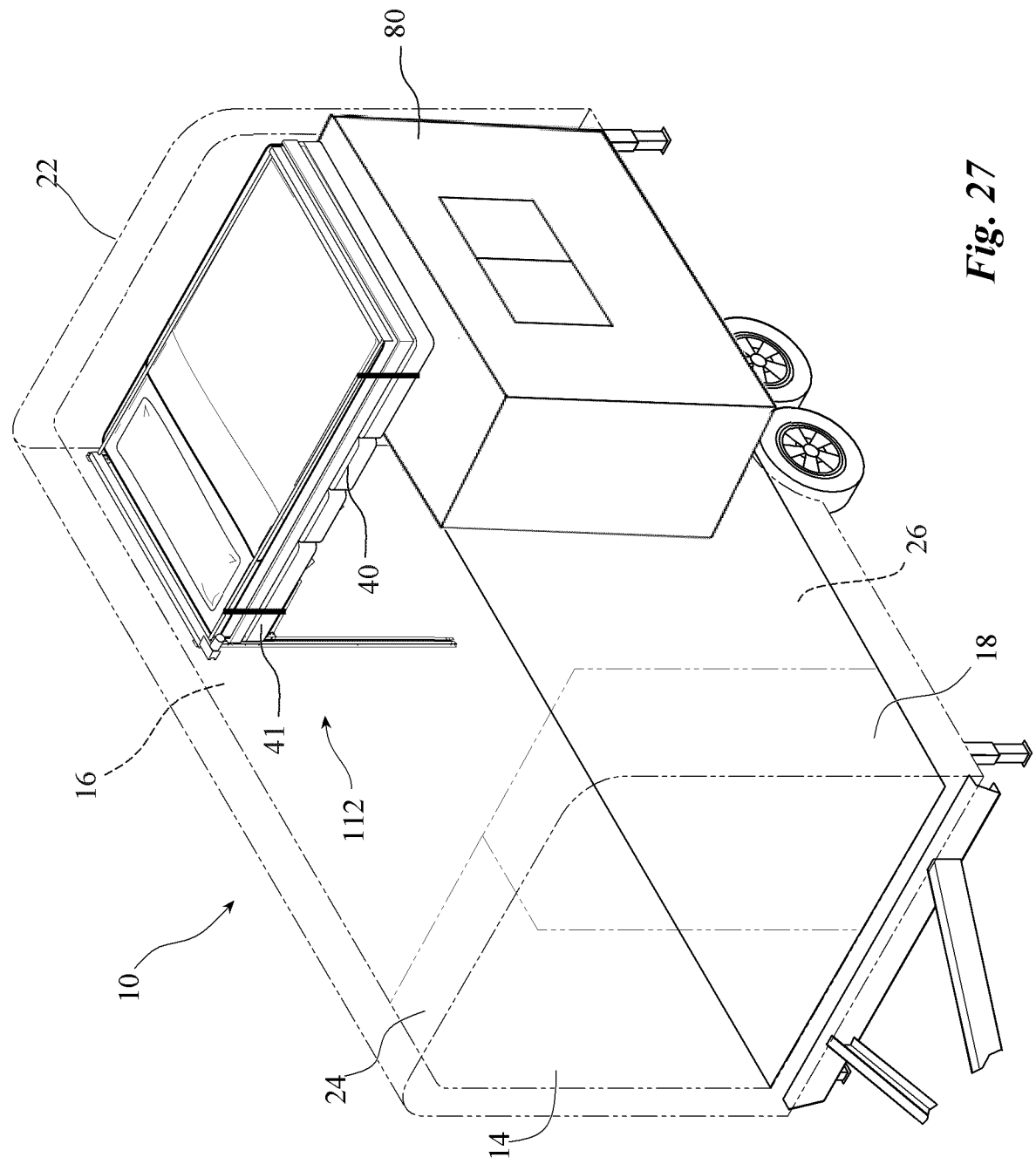
FIG. 27 is a perspective view of the embodiment of the recreational vehicle shown FIG. 26 with the bunk beds positioned above the retracted slide-out room.

FIGS. 26-27 show another embodiment of the vehicle 10 with a slide-out room 80 that moves between an extended position and a retracted position. The slide-out room 80 retracts into the cargo area 28 of the vehicle 10. This is the same area where the bed lift 112 and the beds 40, 41 are positioned.

FIG. 26 shows the slide-out room 80 in an extended position and the bed lift 112 in a sleeping configuration where the beds are lowered and oriented horizontally to receive one or more persons to sleep thereon. In the extended position, the slide-out room 80 does not interfere with the vertical movement of the beds 40, 41 in the cargo area 28.

FIG. 27 shows the slide-out room 80 in a retracted position in the cargo area 28 and the bed lift 112 in a stowed configuration where the beds 40, 41 are raised and oriented horizontally adjacent to the ceiling 24 of the vehicle 10. This is the configuration used to transport the vehicle 10.

The procedure for extending/retracting the slide-out room 80 and lowering/raising the beds 40, 41 is as follows. The vehicle 10 is initially in the configuration shown in FIG. 27. The beds 40, 41 are stowed adjacent to the ceiling 24 of the vehicle 10 and the slide-out room 80 is retracted into the cargo area 28.

The slide-out room 80 is extended to the extended position shown in FIG. 26 so that it is no longer in the cargo area 28. With the slide-out room 80 out of the way, the beds 40, 41 are lowered to the sleeping configuration shown in FIG. 26. The procedure is reversed to raise the beds 40, 41 and retract the slide-out room 80.

Figure 28:
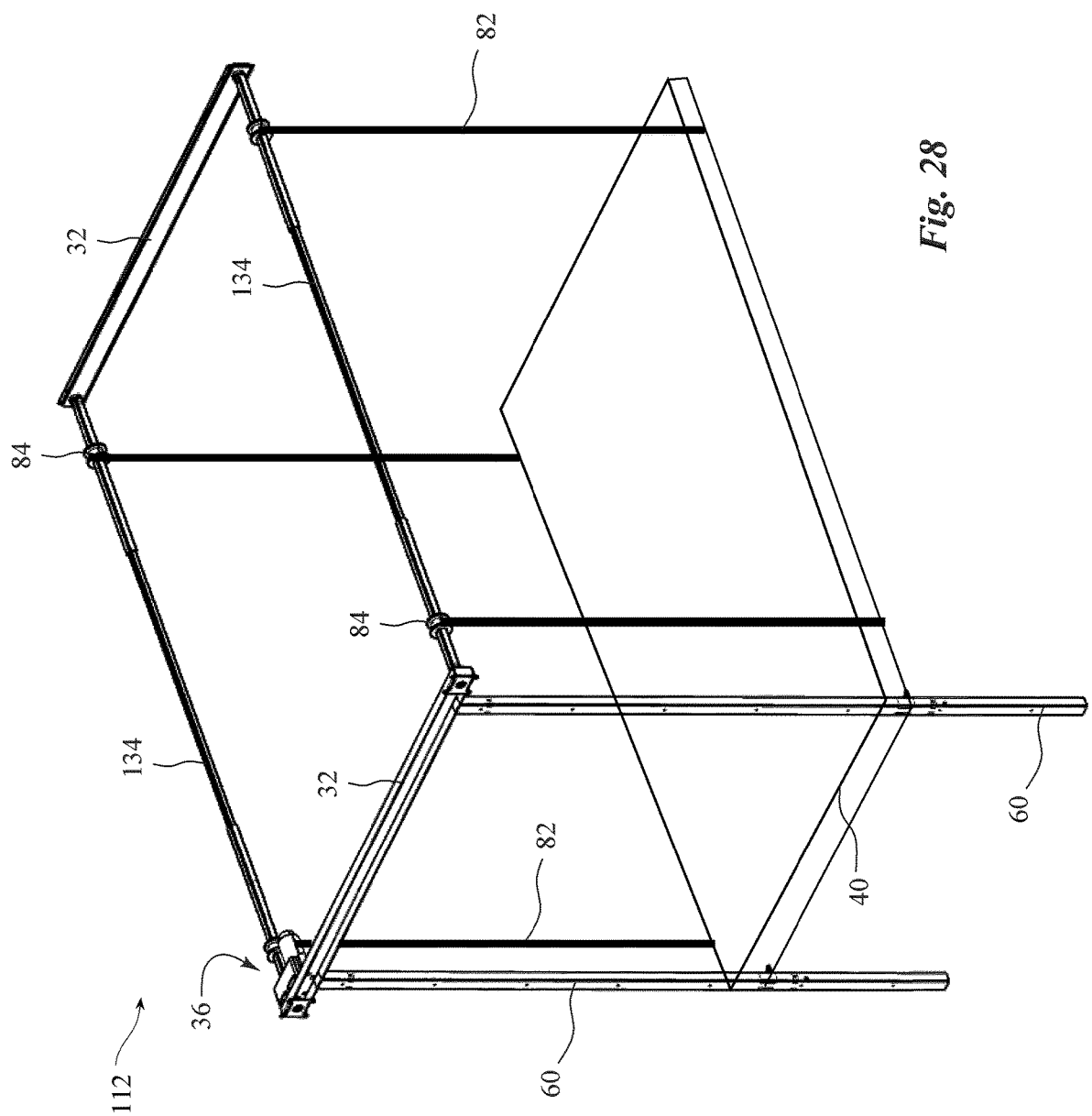
FIG. 28 is a perspective view of one embodiment of bed lift that can be used to vertically move the bunk beds in the recreational vehicle in FIGS. 26-27.
Figure 29:
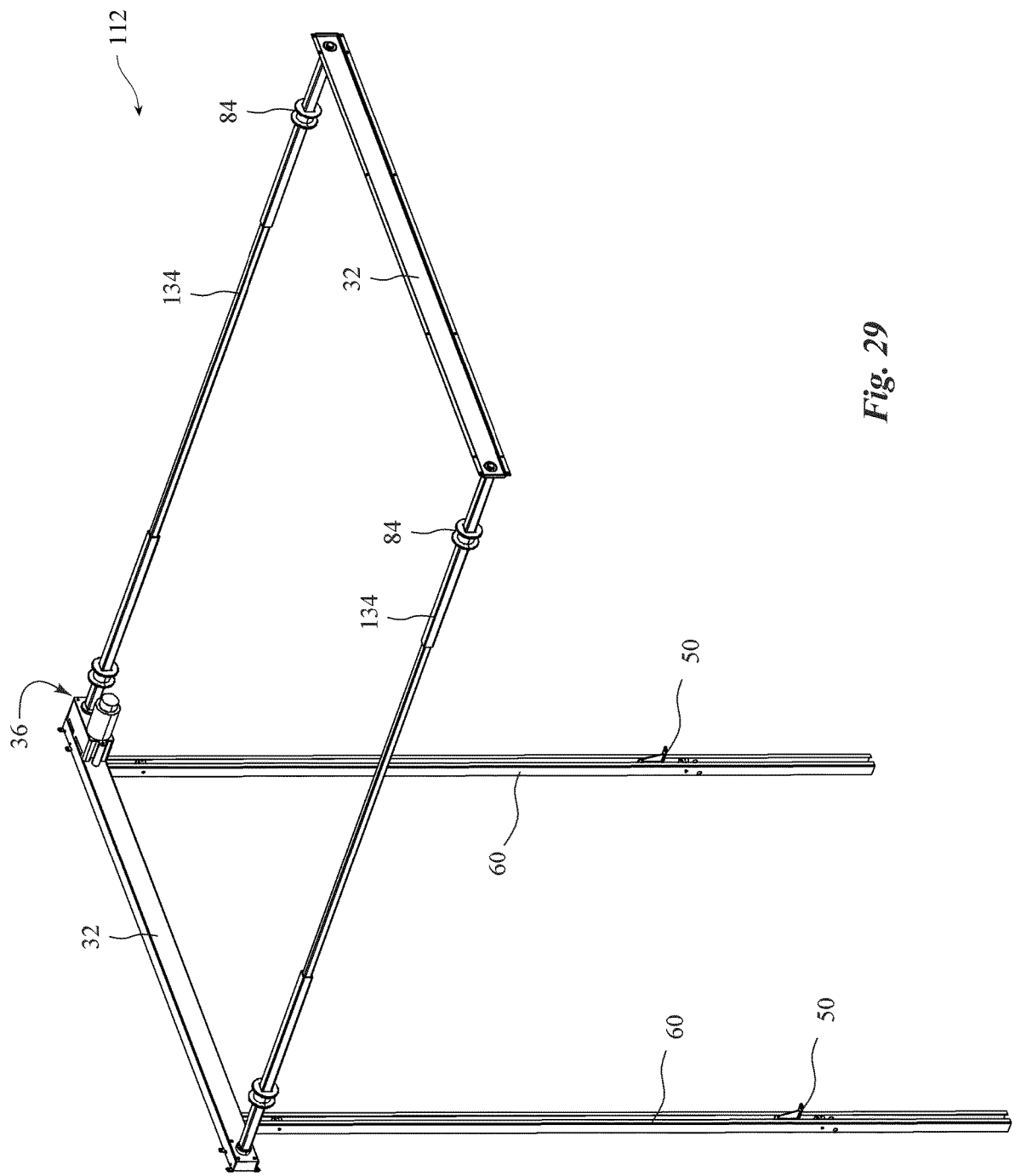
FIG. 29 is a perspective view of the bed lift in FIG. 28 with the bed and flexible drive members removed.

It should be appreciated that any suitable bed lift can be used to move the beds 40, 41 in the manner shown in FIGS. 26-27. One embodiment of such a bed lift 112 is shown in FIGS. 28-29. The bed lift 112 includes the motor assembly 36, the cross members 32, drive assemblies 134 (alternatively referred to as drive shaft assemblies), guide members 60, and flexible drive members 82 coupled to the drive assemblies 134. The drive assemblies 134 are positioned directly above the sides of the bed 40 and include spools 84.

Figure 31:
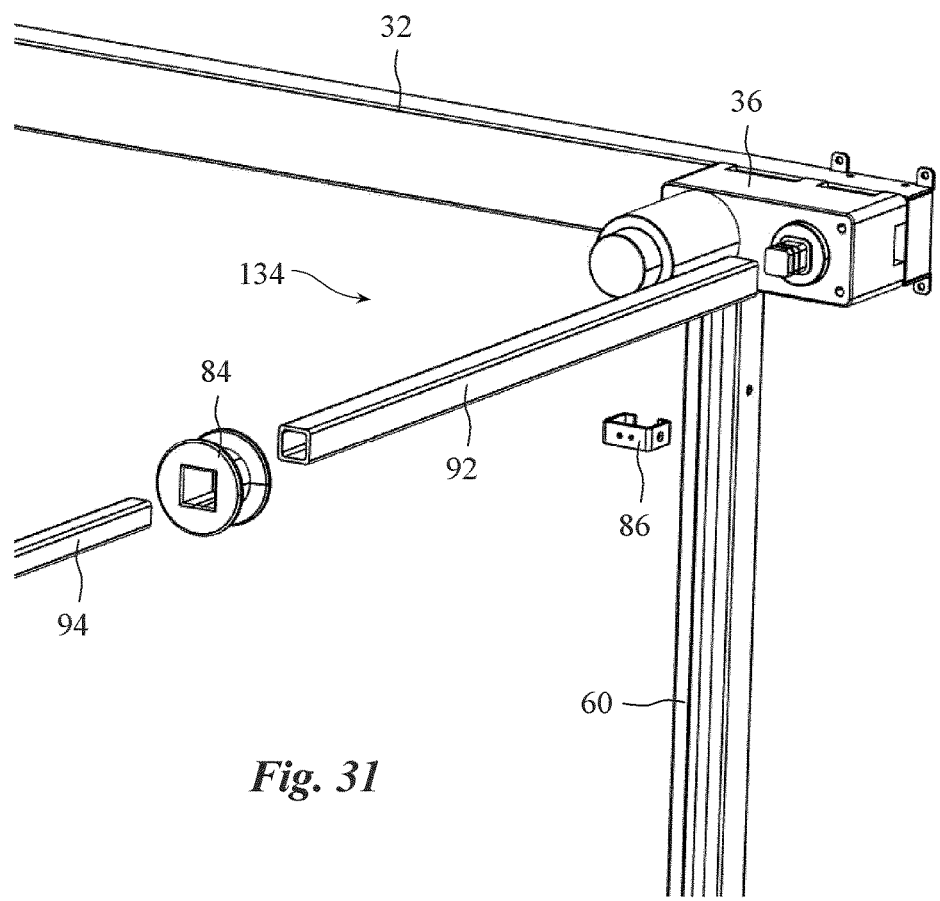
FIG. 31 is a perspective view of side of the bed lift in FIG. 28 that is coupled to the wall opposite the slide-out room.
Figure 32:
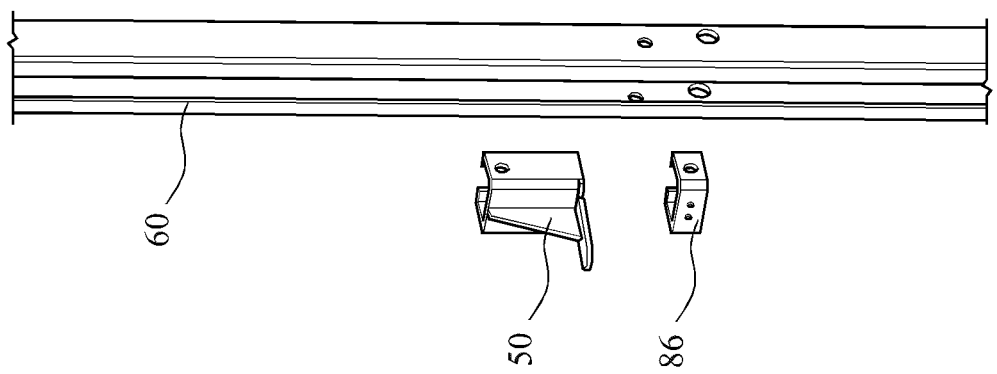
FIG. 32 is a perspective view of one embodiment of a guide member and trolley used to guide vertical movement of the bed in FIG. 28.

The guide members 60 are coupled to the first side wall 16, which is positioned opposite the slide-out room 80. The bed 40 is coupled to trolleys 50. The trolleys 50 move along the guide members 60 to guide vertical movement of the bed 40 and prevent the bed 40 from swinging. Referring to FIGS. 31-32, brackets 86 can be coupled to the guide members 60 to serve as an attachment location at which sensors can be placed to indicate when the bed 40 has reached the lowered position or sleeping configuration and/or the raised position or stowed configuration.

One of the cross members 32 is coupled to the side wall 16 and the guide members 60. The other cross member 32 is coupled to the side wall 18 above the opening through which the slide-out room 80 extends and retracts. In some embodiments, the cross member 32 is not provided on the side wall 18. Instead, the drive assemblies 134 are separately coupled to the side wall 18 above the opening for the slide-out room 80.

The motor assembly 36 is configured to rotate the drive assemblies 134 and wrap or unwrap the flexible drive members 82 on or off the spools 84. Rotation of the drive assemblies 134 is synchronized using the flexible drive member 62 (concealed by the cross member 32 in FIGS. 28-29).

The lower ends of the flexible drive members 82 are coupled to the bed 40. Rotating the drive assemblies 134 one direction wraps the flexible drive members 82 on the spools 84 and raises the bed 40. Rotating the drive assemblies 134 the other direction unwraps the flexible drive members 82 off the spools 84 and lowers the bed 40.

It should be appreciated that the flexible drive members 82 can be any suitable type of drive member. In some embodiments, the flexible drive members 82 include a strap such as a fabric strap that is relatively thin and wide and easily wraps on and off the spools 84.

In some embodiments, there are no flexible drive members, drive trolleys or other drive components in the guide members 60. The bed 40 is lifted solely by the flexible drive members 82 wrapping on the drive assemblies 134 and the guide members 60 solely guide the movement. In other embodiments, the guide members 60 can include the drive trolleys 52 and the flexible drive members 66 as described above. The drive trolleys 52 lift the one side of the bed 40 and the flexible drive members 82 lift the other side of the bed 40 (the flexible drive members 82 nearest the guide members 60 are eliminated).

Figure 30:
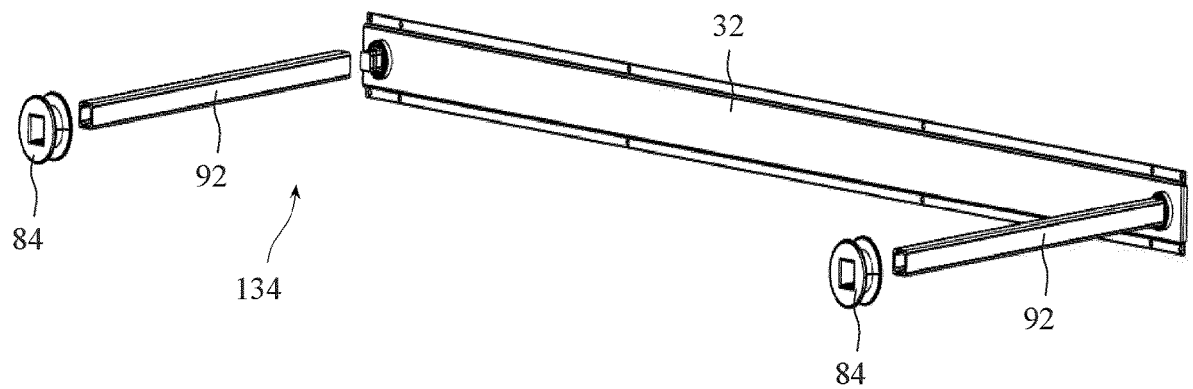
FIG. 30 is a perspective view of the side of the bed lift in FIG. 28 that is coupled to the wall of the recreational vehicle above the slide-out room.

It should be appreciated that the drive assemblies 134 can have any suitable configuration capable of rotating the spools 84 and lifting the bed 40. FIGS. 30-31 show one embodiment of the drive assemblies 134 that include drive tubes or shafts 92, 94 having corresponding polygonal shapes such as square, rectangular, or the like. The drive tubes 92 are sized and shaped to be received by corresponding shaped openings in the spools 84. The drive tubes 94 are sized and shaped to be received by corresponding shaped openings in the drive tubes 92. The spools 84 and drive tubes 92, 94 can be held in place by any suitable fastener such as, for example, a self-tapping fastener that extends through the spools 84 and the drive tubes 92, 94 (the spools 84 and drive tubes 92, 94 can be made of metal, plastic, composites, or the like).

Figure 33:
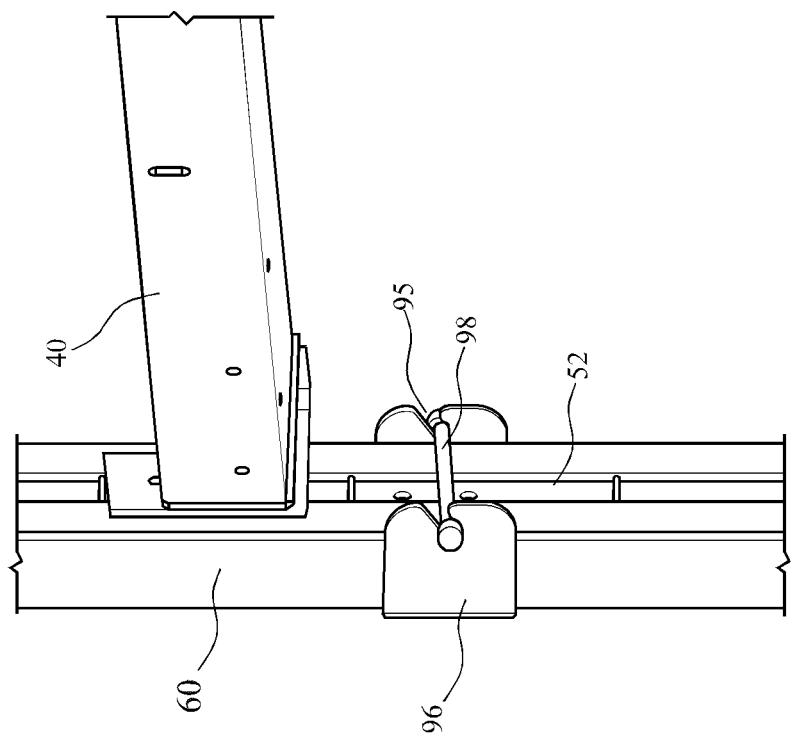
FIG. 33 is a perspective view of one embodiment of a failsafe stop mechanism that can be used to prevent unwanted downward movement of a bed.

FIG. 33 shows one embodiment of a failsafe stop mechanism 96 that can be used to prevent unwanted downward movement of the bed 40. The failsafe stop mechanism 96 has a U-shape that extends around the guide member 60. The front of the stop mechanism 96 includes a slot 95 configured to receive a pin or bolt 98.

The slot 95 is inclined upward to prevent the pin 98 from becoming dislodged when the weight of the bed 40 is bearing down on it. The upward incline of the slot 95 also allows the pin 98 to be pushed out of the slot 95 by the bed 40 moving upward. In this way, the stop mechanism 96 can be considered as only operating one way—i.e., when the bed 40 is moving down against the stop mechanism 96.

Figure 34:
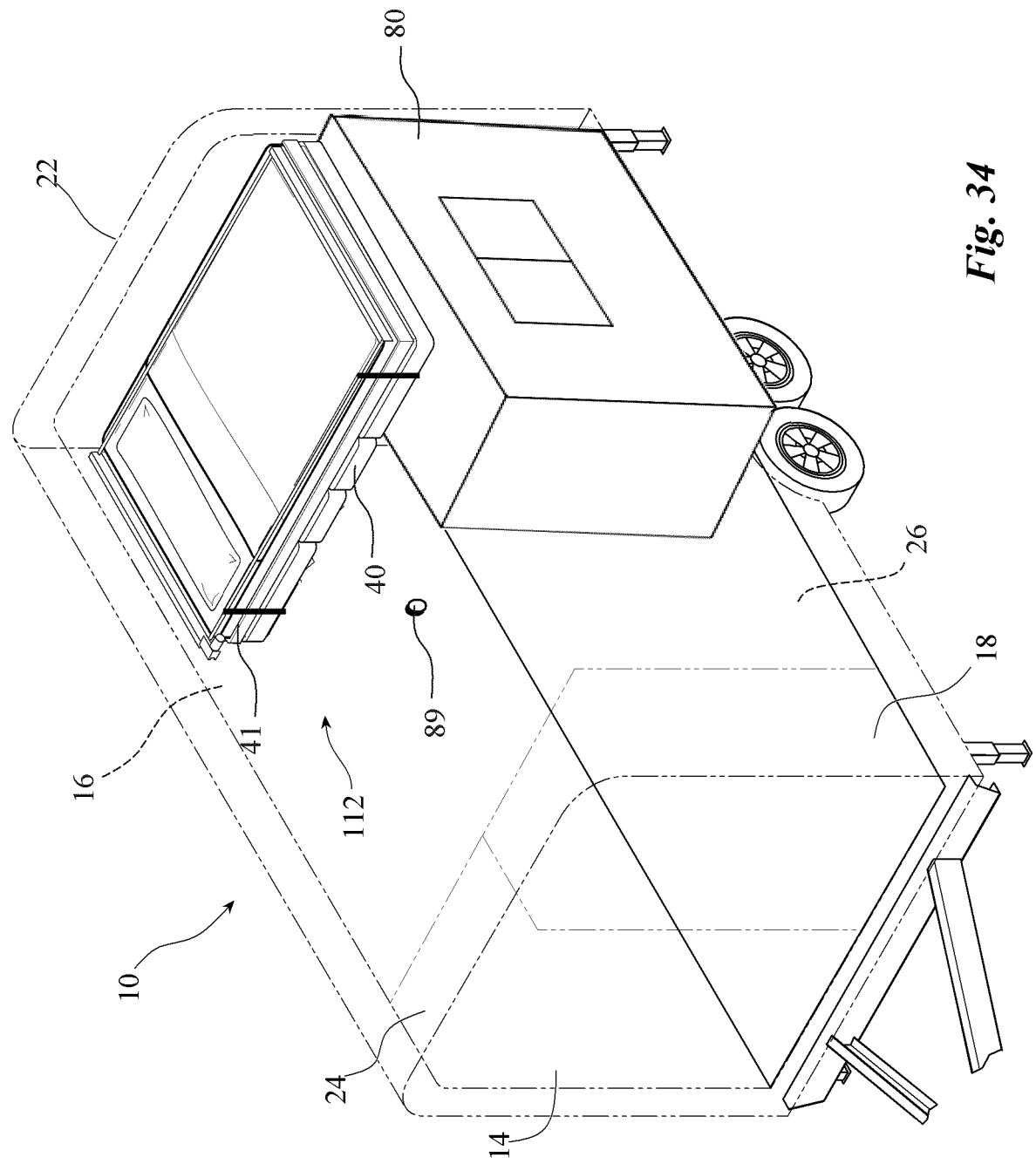
FIG. 34 is a perspective view of one embodiment of a recreational vehicle with bunk beds raised and in a stowed configuration above a retracted slide-out room. The bunk beds can be supported in the lowered position by a support disc.
Figure 35:
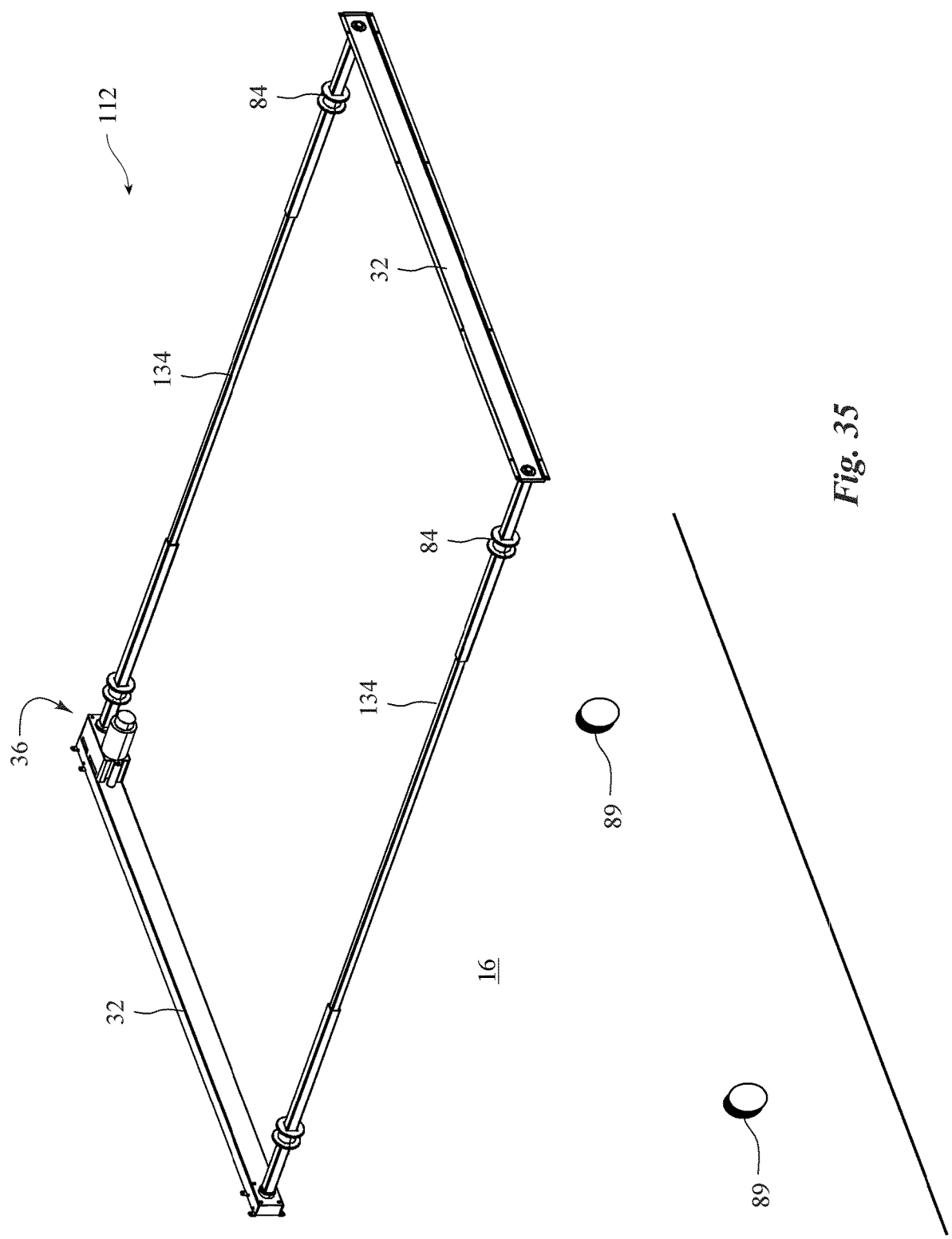
FIG. 35 is a perspective view of the interior of the recreational vehicle in FIG. 34 that better shows the position of the support discs on the wall of the recreational vehicle.
Figure 36:
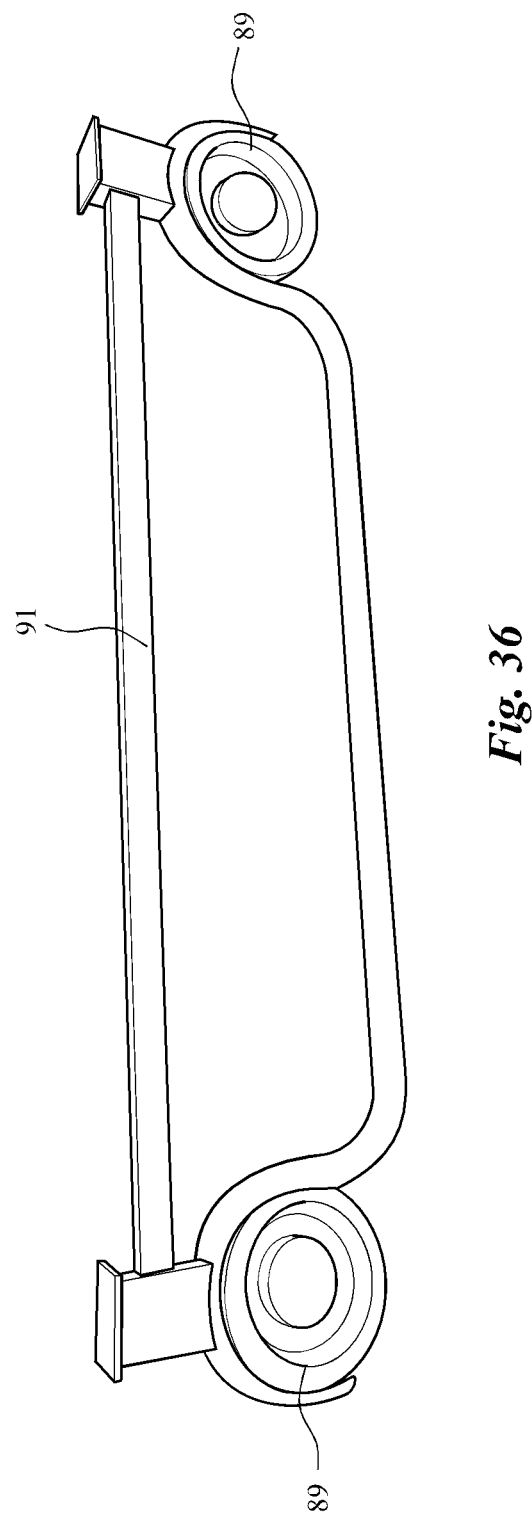
FIG. 36 is a perspective view of one embodiment of a bed frame configured to engaged and rest on the support discs shown in FIGS. 34-35.

FIGS. 34-36 show another embodiment of the bed lift 112 where the guide members 60 have been removed and replaced by support discs or support members 89. The support discs 89 are coupled to the side wall 16 at a height that corresponds to the height of the bed 40 in the sleeping configuration. The bed 40 includes a frame 91 having recesses configured to correspond to the shape of the support discs 89. The bed 40 is lowered until the frame 91 engages or rests upon the support discs 89.

The combination of the support discs 89 and the frame 91 function to further stabilize the bed 40 in the sleeping configuration. In particular, the support discs 89 hold the bed 40 in place and prevent it from swinging or swaying lengthwise in the vehicle 10.

ILLUSTRATIVE EMBODIMENTS

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A structure comprising: a bed movable between a sleeping configuration where the bed is lowered and oriented horizontally to receive one or more persons to sleep thereon, a stowed configuration where the bed is raised, and a split configuration where a first portion of the bed is lowered and a second portion of the bed is raised.

P2. The structure of paragraph P1 wherein the structure is a recreational vehicle.

P3. The structure of paragraph P1 wherein the bed is movable translationally or approximately translationally between the sleeping configuration, the stowed configuration, and the split configuration.

P4. The structure of paragraph P1 wherein the first portion of the bed is movable between a flat configuration and a seating configuration where the first portion includes a seat base and a seat back to receive one or more persons to sit thereon.

P5. The structure of paragraph P1 wherein the bed is a first bed and the structure includes a second bed positioned above the first bed, and wherein the second bed moves between a sleeping configuration where the second bed is lowered and oriented horizontally to receive one or more persons to sleep thereon and a stowed configuration where the second bed is raised.

P6. The structure of paragraph P1 wherein the first portion of the bed is configured to rotate about a vertical axis and face multiple directions.

P7. The structure of paragraph P1 comprising: at least two lifting assemblies coupled to the bed; wherein vertical movement of the at least two lifting assemblies is synchronized.

P8. The structure of paragraph P7 wherein at least one of the lifting assemblies comprises: a guide member; and a drive carriage slidingly coupled to the guide member, the drive carriage being configured to move the bed from the sleeping configuration to the stowed configuration; wherein the bed is coupled to the at least one lifting assembly in a manner that allows the bed to move vertically along the guide member separately from the drive carriage.

P9. The structure of paragraph P8 were in the second portion of the bed is coupled to the guide member and held in a raised position relative to the first portion of the bed.

P10. A structure comprising: a bed movable between a sleeping configuration where the bed is lowered and oriented horizontally to receive one or more persons to sleep thereon, a stowed configuration where the bed is raised, a first seating configuration where the bed forms a seating unit including a seat base and a seat back and faces one direction, and a second seating configuration where the seating unit faces another direction.

P11. The structure of paragraph P10 wherein the bed rotates about a vertical axis between the first seating configuration and the second seating configuration.

P12. The structure of paragraph P10 wherein the direction the seating unit faces in the first seating configuration is perpendicular or approximately perpendicular to the direction the seating unit faces in the second seating configuration.

P13. The structure of paragraph P10 wherein the structure is a recreational vehicle.

P14. The structure of paragraph P13 wherein the recreational vehicle is a toy hauler including an open ramp door that is open, and wherein the seating unit faces the open ramp door in the second seating configuration.

P15. The structure of paragraph P13 wherein the seating unit faces parallel to a lengthwise direction of the recreational vehicle in the first seating configuration and faces parallel to a crosswise direction of the recreational vehicle in the second seating configuration.

P16. The structure of paragraph P10 comprising: a first lifting assembly coupled to the bed; and a second lifting assembly coupled to the bed; wherein vertical movement of the first lifting assembly and the second lifting assembly is synchronized.

P17. The structure of paragraph P16 wherein the bed is coupled to the first lifting assembly with a first mounting bracket configured to rotate about a vertical axis and allow the bed to rotate relative to the first lifting assembly; wherein the bed is coupled to the second lifting assembly with a second mounting bracket configured to selectively decouple the bed from the second lifting assembly and couple the bed to the second lifting assembly; and wherein the bed rotates about the vertical axis between the first seating configuration and the second seating configuration.

P18. The structure of paragraph P10 wherein the bed comprises a first portion and a second portion; wherein the first portion forms the seating unit in the first seating configuration and the second seating configuration; and wherein the second portion is in an upright configuration when the bed is in at least one of the first seating configuration or the second seating configuration.

P19. A bed lift configured to be coupled to a structure and move a bed in the structure between a sleeping configuration where the bed is lowered and oriented horizontally to receive one or more persons to sleep thereon, a stowed configuration where the bed is raised, a first seating configuration where the bed forms a seating unit including a seat base and a seat back and faces one direction, and a second seating configuration where the seating unit faces another direction.

P20. The bed lift of paragraph P19 comprising a first lifting assembly configured to be coupled to the bed with a first mounting bracket configured to rotate about a vertical axis and allow the bed to rotate relative to the first lifting assembly between the first seating configuration and the second seating configuration; and a second lifting assembly configured to be coupled to the bed with a second mounting bracket configured to selectively decouple the bed from the second lifting assembly and couple the bed to the second lifting assembly; wherein vertical movement of the first lifting assembly and the second lifting assembly is synchronized.

P21. A bed lift for a structure, the bed lift comprising: a first lifting assembly configured to be coupled to a bed with a first mounting bracket; a second lifting assembly configured to be coupled to the bed with a second mounting bracket; wherein the first mounting bracket is configured to rotate about a vertical axis and allow the bed to rotate relative to the first lifting assembly; and wherein the second mounting bracket is configured to selectively decouple the bed from the second lifting assembly and couple the bed to the second lifting assembly.

P22. A structure comprising: a slide-out room movable between a retracted position where the slide-out room is retracted into an area in the structure and an extended position where the slide-out room is extended outward from the structure; and a bed movable between a sleeping configuration where the bed is lowered and oriented horizontally to receive one or more persons to sleep thereon and a stowed configuration where the bed is raised; wherein the bed is positioned in the area in the structure into which the slide-out room is retracted.

P23. The structure of paragraph P22 wherein the structure is a recreational vehicle.

P24. The structure of paragraph P22 wherein the bed interferes with moving the slide-out room from the extended position to the retracted position when the bed is in the sleeping configuration, and wherein the bed does not interfere with moving the slide-out room from the extended position to the retracted position when the bed is in the stowed configuration.

P25. The structure of paragraph P22 wherein the bed is parallel to a crosswise direction of the structure.

P26. The structure of paragraph P22 comprising: a bed lift comprising a guide member coupled to a first side wall of the structure facing the slide-out room; wherein the guide member is coupled to the bed and configured to guide movement of the bed between the sleeping configuration and the stowed configuration.

P27. The structure of paragraph P26 wherein the bed lift comprises at least two flexible drive members coupled to the bed, and wherein the bed lift is configured to wrap the flexible drive members to lift the bed and unwrap the flexible drive members to lower the bed.

P28. The structure of paragraph P27 wherein the flexible drive members wrap on at least one drive shaft positioned above the bed.

P29. The structure of paragraph P26 wherein the slide-out room extends through a second side wall of the structure, and wherein the bed lift is coupled to the second side wall above the slide-out room.

P30. The structure of paragraph P22 wherein at least a portion of the bed is positioned above the slide-out room when the bed is in the stowed configuration and the slide-out room is retracted into the structure.

P31. A structure comprising: a first side wall; a second side wall positioned opposite the first side wall; a slide-out room extending through an opening in the second side wall, the slide-out room being movable between a retracted position where the slide-out room is retracted in the structure and an extended position where the slide-out room is extended outward from the structure; a bed positioned in the structure, the bed being movable between a sleeping configuration where the bed is lowered and oriented horizontally to receive one or more persons to sleep thereon and a stowed configuration where the bed is raised; a bed lift positioned in the structure, the bed lift comprising: a guide member coupled to the first side wall and the bed, the guide member being configured to guide movement of the bed between the sleeping configuration and the stowed configuration; and a drive shaft coupled to and extending between the first side wall and the second side wall, the drive shaft being coupled to the second side wall above the opening for the slide-out room; a flexible drive member coupled to the bed and the drive shaft; wherein the bed lift is configured to wrap the flexible drive member on the drive shaft to raise the bed and unwrap the flexible drive member off the drive shaft to lower the bed.

P32. The structure of paragraph P31 wherein the structure is a recreational vehicle.

P33. The structure of paragraph P31 wherein the bed interferes with moving the slide-out room from the extended position to the retracted position when the bed is in the sleeping configuration, and wherein the bed does not interfere with moving the slide-out room from the extended position to the retracted position when the bed is in the stowed configuration.

P34. The structure of paragraph P31 wherein at least a portion of the bed is positioned above the slide-out room when the bed is in the stowed configuration and the slide-out room is retracted into the structure.

P35. The structure of paragraph P31 wherein the drive shaft is a first drive shaft and the flexible drive member is a first flexible drive member, and wherein the bed lift comprises: a second drive shaft coupled to and extending between the first side wall and the second side wall, the second drive shaft being coupled to the second side wall above the opening for the slide-out room; and a second flexible drive member coupled to the bed and the second drive shaft; wherein the bed lift is configured to wrap the second flexible drive member on the second drive shaft to raise the bed and unwrap the second flexible drive member off the second drive shaft to lower the bed.

P36. The structure of paragraph P31 wherein the guide member is a first guide member, and wherein the bed lift comprises: a second guide member coupled to the first side wall and the bed, the second guide member being configured to guide movement of the bed between the sleeping configuration and the stowed configuration; and P37. The structure of paragraph P31 wherein the bed lift comprises a failsafe stop mechanism configured to prevent further downward movement of the bed.

P38. The structure of paragraph P37 wherein the failsafe stop mechanism is coupled to the guide member.

P39. A bed lift configured to lift a bed in a structure with a slide-out room, the bed lift comprising: a guide member configured to be coupled to the bed and a first side wall of the structure that is positioned opposite a second side wall through which the slide-out room extends and retracts; a drive shaft configured to be coupled between the first side wall and the second side wall; wherein the drive shaft is configured to be coupled to the second side wall above the slide-out room; wherein the bed lift is configured to move the bed between a sleeping configuration where the bed is lowered and oriented horizontally to receive one or more persons to sleep thereon and a stowed configuration where the bed is raised.

P40. The bed lift of paragraph P38 comprising a motor mechanically linked to rotate the drive shaft.

P41. The bed lift of paragraph P38 wherein the bed lift is configured to move the bed to the stowed configuration where neither the bed lift nor the bed interfere with retracting the slide-out room into the structure.

P42. The structure of paragraph P10 wherein the direction the seating unit faces in the first seating configuration is opposite or approximately opposite the direction the seating unit faces in the second seating configuration.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of" or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, it is terms such as "processing," "computing," "calculating," "determining," "displaying," or the like, refer to the action and processes of an electronic controller including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Priority patent documents incorporated by reference:

U.S. Prov. App. No. 63/094,341, titled "Bed Lift," filed on 20 Oct. 2020.

Additional documents incorporated by reference:

U.S. Pat. Pub. No. 2019/0217752 (application Ser. No. 16/247,536), titled "Bed Support Mechanism for a Bed Lift," filed on 14 Jan. 2019, published on 18 Jul. 2019.

U.S. Pat. Pub. No. 2018/0027978 (application Ser. No. 15/660,938), titled "Furniture Lifting System," filed on 26 Jul. 2017, published on 1 Feb. 2018.

U.S. Pat. Pub. No. 2015/0329035 (application Ser. No. 14/714,215), titled "Bed Lift Mounting Member," filed on 15 May 2015, published on 19 Nov. 2015.

U.S. Pat. Pub. No. 2013/0081336 (application Ser. No. 13/685,471), titled "Bed Lift," filed on 26 Nov. 2012, published on 4 Apr. 2013.

The invention claimed is:

1. A structure comprising:
a bed movable between a sleeping configuration where the bed is lowered and oriented horizontally to receive one or more persons to sleep thereon, a stowed configuration where the bed is raised, and a split configuration where a first portion of the bed is lowered and a second portion of the bed is raised; and
at least two lifting assemblies coupled to the bed, at least one of the lifting assemblies comprising:
a guide member; and
a drive carriage slidingly coupled to the guide member, the drive carriage being configured to move the bed from the sleeping configuration to the stowed configuration;
wherein vertical movement of the at least two lifting assemblies is synchronized; and
wherein the bed is coupled to the at least one lifting assembly in a manner that allows the bed to move vertically along the guide member separately from the drive carriage.

2. The structure of claim 1 wherein the structure is a recreational vehicle.

3. The structure of claim 1 wherein the bed is movable translationally or approximately translationally between the sleeping configuration, the stowed configuration, and the split configuration.

4. The structure of claim 1 wherein the first portion of the bed is movable between a flat configuration and a seating configuration where the first portion includes a seat base and a seat back to receive one or more persons to sit thereon.

5. The structure of claim 1 wherein the bed is a first bed and the structure includes a second bed positioned above the first bed, and wherein the second bed moves between a sleeping configuration where the second bed is lowered and oriented horizontally to receive one or more persons to sleep thereon and a stowed configuration where the second bed is raised.

6. The structure of claim 1 wherein the first portion of the bed is configured to rotate about a vertical axis and face multiple directions.

7. The structure of claim 1 wherein the second portion of the bed is coupled to the guide member and held in a raised position relative to the first portion of the bed.

8. A structure comprising:
a bed movable between a sleeping configuration where the bed is lowered and oriented horizontally to receive one or more persons to sleep thereon, a stowed configuration where the bed is raised, a first seating configuration where the bed forms a seating unit including a seat base and a seat back and faces one direction, and a second seating configuration where the seating unit faces another direction;
wherein the bed rotates about a vertical axis between the first seating configuration and the second seating configuration.

9. The structure of claim 8 wherein the bed is movable between the stowed configuration and a split configuration where a first portion of the bed is lowered and a second portion of the bed is raised.

10. The structure of claim 8 wherein the direction the seating unit faces in the first seating configuration is perpendicular or approximately perpendicular to the direction the seating unit faces in the second seating configuration.

11. The structure of claim 8 wherein the structure is a recreational vehicle.

12. The structure of claim 11 wherein the recreational vehicle is a toy hauler including an open ramp door that is open, and wherein the seating unit faces the open ramp door in the second seating configuration.

13. The structure of claim 11 wherein the seating unit faces parallel to a lengthwise direction of the recreational vehicle in the first seating configuration and faces parallel to a crosswise direction of the recreational vehicle in the second seating configuration.

14. The structure of claim 8 comprising:
a first lifting assembly coupled to the bed; and
a second lifting assembly coupled to the bed;
wherein vertical movement of the first lifting assembly and the second lifting assembly is synchronized.

15. The structure of claim 14
wherein the bed is coupled to the first lifting assembly with a first mounting bracket configured to rotate about the vertical axis and allow the bed to rotate relative to the first lifting assembly;
wherein the bed is coupled to the second lifting assembly with a second mounting bracket configured to selectively decouple the bed from the second lifting assembly and couple the bed to the second lifting assembly.

16. The structure of claim 8 wherein the bed comprises a first portion and a second portion;

wherein the first portion forms the seating unit in the first seating configuration and the second seating configuration; and wherein the second portion is in an upright configuration when the bed is in at least one of the first seating configuration or the second seating configuration.

17. A bed lift configured to be coupled to a structure and move a bed in the structure between a sleeping configuration where the bed is lowered and oriented horizontally to receive one or more persons to sleep thereon, a stowed configuration where the bed is raised, a first seating configuration where the bed forms a seating unit including a seat base and a seat back and faces one direction, and a second seating configuration where the seating unit faces another direction, wherein the bed rotates about a vertical axis between the first seating configuration and the second seating configuration.

18. The bed lift of claim 17 comprising
a first lifting assembly configured to be coupled to the bed with a first mounting bracket configured to rotate about the vertical axis and allow the bed to rotate relative to the first lifting assembly between the first seating configuration and the second seating configuration; and
a second lifting assembly configured to be coupled to the bed with a second mounting bracket configured to selectively decouple the bed from the second lifting assembly and couple the bed to the second lifting assembly;
wherein vertical movement of the first lifting assembly and the second lifting assembly is synchronized.

19. The bed lift of claim 17 wherein the direction the seating unit faces in the first seating configuration is perpendicular or approximately perpendicular to the direction the seating unit faces in the second seating configuration.

20. The bed lift of claim 17 comprising:
a first lifting assembly configured to be coupled to the bed; and
a second lifting assembly configured to be coupled to the bed;
wherein vertical movement of the first lifting assembly and the second lifting assembly is synchronized.

* * * * *